US005953698A

United States Patent [19]

Hayata

[11] Patent Number: 5,953,698

[45] Date of Patent: Sep. 14, 1999

[54] SPEECH SIGNAL TRANSMISSION WITH ENHANCED BACKGROUND NOISE SOUND QUALITY

[75] Inventor: Toshihiro Hayata, Tokyo, Japan

[73] Assignee: NEC Corporation, Tokyo, Japan

[21] Appl. No.: 08/897,514

[22] Filed: Jul. 21, 1997

[30] Foreign Application Priority Data

Jul. 22, 1996 [JP] Japan .................................... 8-191944

[51] Int. Cl.[6] .................................................. G01L 9/14

[52] U.S. Cl. ............................................ 704/230; 704/226

[58] Field of Search .................................... 704/215, 201, 704/219, 226, 220, 222, 230, 200, 224, 223, 227, 228, 233

[56] References Cited

U.S. PATENT DOCUMENTS

| | | | |
|---|---|---|---|
| 5,042,069 | 8/1991 | Chhatwal et al. | 381/31 |
| 5,553,190 | 9/1996 | Ohya et al. | 704/201 |
| 5,687,283 | 11/1997 | Wake | 704/215 |
| 5,774,846 | 6/1998 | Morii | 704/232 |
| 5,787,388 | 7/1998 | Hayata | 704/215 |
| 5,787,391 | 7/1998 | Moriya et al. | 704/225 |
| 5,802,109 | 9/1998 | Sano | 375/245 |

OTHER PUBLICATIONS

S. Furui, "Digital Onsei Syori (Digital Speech Processing)", The Publishing Society of Tokai University, Ver. 1, Sep. (1985), pp. 60–62, pp. 73–78, pp. 89–92.

K. Ozawa, "High Efficiency Speech Coding Technique for Digital Radio Mobile Communication", Triceps, Apr. (1992), pp. 99–103.

GSM Recommendation 6.10, "GSM Full Rate Speech Transcoding", (Jul.) 1989, pp.1–93.

*Primary Examiner*—Richemond Dorvil
*Attorney, Agent, or Firm*—Foley & Lardner

[57] ABSTRACT

A speech transmission method which is applied to a speech coding and decoding system performing VOX (Voice Operated Transmitter) processing. The method can reduce an unfamiliar feeling of background noise to be outputted on the reception side. The method includes the steps of generating a background noise updating signal when a pause period is detected, and calculating a quantized spectrum, a non-quantized spectrum envelope and a quantized spectrum envelope from an input speech signal in the pause period on the transmission side. When a difference between the non-quantized spectrum envelope and the quantized spectrum envelope is larger than a predetermined threshold value, the quantized spectrum is changed and the background noise updating signal is produced based on the changed quantized spectrum.

6 Claims, 14 Drawing Sheets

SPEECH SIGNAL TRANSMISSION WITH ENHANCED BACKGROUND NOISE SOUND QUALITY

BACKGROUND OF THE INVENTION

1. Field of the Invention

This invention relates to a speech coding and decoding system which includes a speech coding apparatus and a speech decoding apparatus and a speech signal transmission method for use with the system. More specifically, the present invention relates to a speech coding and decoding system which has a VOX (Voice Operated Transmitter) function by which data are transmitted only while a speaker is uttering.

2. Description of the Prior Art

In a speech coding and decoding system wherein speech of a speaker is coded by a speech coding apparatus and the coded data are transmitted to a speech decoding apparatus and then the data are decoded by and outputted from the speech decoding apparatus, a VOX function is provided frequently for the object of reduction of the power dissipation or effective utilization of the circuit band. This VOX function allows transmission of data from the coding apparatus side to the decoding apparatus side only within a speech burst period, that is, within a period within which the speaker is uttering. Within a pause period, that is, within a period within which no sound is inputted to the coding apparatus, the coding apparatus stops its transmission. Instead, on the decoding apparatus side, a kind of background noise is produced and outputted to eliminate unnatural speech communication which arises from the use of the VOX function.

As a speech coding and decoding system having such a VOX function as just described, a system is known and disclosed, for example, in Japanese Patent Laid-Open Application No. Heisei 5-122165 (JP, A, 5-122165) (Document 1) wherein, when a speech burst period is detected, a preamble signal is transmitted first and then coded data of speech are transmitted, but when a pause period is detected, a postamble signal is transmitted, whereas, on the decoding apparatus side, outputting of background noise is switchably started upon reception of the postamble signal.

In the following, a conventional speech coding and decoding system by digital radio transmission is described. FIG. 1 shows a construction of a speech coding apparatus, that is, a transmission side apparatus of a conventional speech coding and decoding system. In a digital radio transmission system, a speech signal inputted to the coding apparatus is cut out and processed for each data sequence called frame. The length in time of the frame is, for example, 40 ms.

A microphone 1 serving as an input terminal of a speech signal is connected to this speech coding apparatus 91. A transmission circuit 15 is connected to an output terminal of the speech coding apparatus 91, and a transmission antenna 11 is connected to the transmission circuit 15. The transmission circuit 15 is provided to convert an output signal of the speech coding apparatus 91 into a radio signal of a suitable frequency and transmit the radio signal from the transmission antenna 11 to the reception side.

In the speech coding apparatus 91, a speech signal inputted from the microphone 1 is inputted to a spectrum envelope analysis portion 2 for analyzing a spectrum envelope of the speech signal, a speech burst period detection portion 3 for discriminating whether or not the current frame is a speech burst period or a pause period, and a high efficiency coding portion 14 which executes high efficiency coding of the speech signal. An output of the spectrum envelope analysis portion 2 is connected to an input of the high efficiency coding portion 14 and also to an input of a spectrum coefficient quantization portion 6, and also an output of the spectrum coefficient quantization portion 6 is inputted to the high efficiency coding portion 14. A data switching portion 10 connected to the transmission circuit 15 is provided on an output of the high efficiency coding portion 14. Also a preamble production portion 8 and a postamble production portion 9 which constitute a unique word production portion 35 are connected to the data switching portion 10. The data switching portion 10 switches a signal to be transmitted from the transmission antenna 11 via the transmission circuit 15 or stops its transmission in response to a result of detection by the speech burst period detection portion 3 as hereinafter described. An output of the data switching portion 10 is supplied as an output of the speech coding apparatus 91 to the transmission circuit 15.

From a speech signal for one frame inputted to the speech coding apparatus 91, a spectrum envelope of the speech signal itself is analyzed and a spectrum coefficient is calculated by the spectrum envelope analysis portion 2. Here, the spectrum coefficient is a characteristic amount which characterizes the spectrum of a speech signal. For the spectrum coefficient, for example, a linear prediction coefficient (LPC) disclosed in Sadaoki FURUI, "Digital Speech Processing", the Publishing Society of Tokai University, Version 1, Sep. 25, 1985 (hereinafter referred to as "Document 2"), pp.60–62, a PARCOR (Partial Auto-correlation) coefficient disclosed similarly in Document 2, pp.73–78 or a LSP (Line Spectrum Pair) disclosed similarly in Document 2, pp.89–92 may be used.

The spectrum coefficient calculated by the spectrum envelope analysis portion 2 is inputted to and quantized by the spectrum coefficient quantization portion 6 to calculate a quantized spectrum coefficient. More particularly, the spectrum coefficient quantization portion 6 holds data produced in advance as a codebook and selects, from within the codebook, data which is discriminated to be nearest to the spectrum coefficient. The spectrum coefficient represented by the selected data is called quantized spectrum coefficient. In the following description, in order to assure clear distinction from a quantized spectrum coefficient, a spectrum coefficient not in a quantized situation outputted from the spectrum envelope analysis portion 2 is hereinafter referred to as "non-quantized spectrum coefficient". Further, a code word of the codebook which provides a quantized spectrum coefficient is referred to as "quantized spectrum code word".

The non-quantized spectrum coefficient and the quantized spectrum coefficient calculated in this manner are inputted together with the speech signal to the high efficiency coding portion 14, by which they are high efficiency coded, whereafter they are inputted to the data switching portion 10.

As described above, the speech signal for one frame inputted from the microphone 1 is inputted also to the speech burst period detection portion 3, by which it is discriminated whether the current frame is a speech burst period within which sound is issued or a pause period within which no sound is issued. A result of the discrimination by the speech burst period detection portion 3 is inputted to the data switching portion 10. If the discrimination is that the current frame is a speech burst period, then the data switching portion 10 selects the high efficiency code outputted from the high efficiency coding portion 14. As a result, the high efficiency code is transmitted via the transmission circuit 15 and the transmission antenna 11 toward the reception side, that is, toward the decoding apparatus side. A situation wherein the current frame is a speech burst period and high efficiency codes continue to be transmitted from the transmission antenna 11 is referred to as "speech burst processing state", and a high efficiency code or codes produced in a speech burst period are referred to as "speech burst code signal".

On the other hand, if the preceding frame is a speech burst period and it is discriminated by the speech burst period detection portion 3 that the current frame is a pause period, the following processing is effected. First, in the current frame, the postamble production portion 9 produces a frame called postamble signal and transmits the postamble signal from the transmission antenna 11 via the data switching portion 10. In the next frame, a speech signal of silence inputted from the microphone 1 is high efficiency coded by the high efficiency coding portion 14 in a similar manner as upon high frequency coding in a speech burst period, and the code is transmitted from the transmission antenna 11. The signal transmitted in this instance is referred to as "background noise updating signal". After the background noise updating code is transmitted, the coding apparatus side stops its transmission for a period of time interval of T frames. After the T frames, a postamble signal and a background noise updating signal are transmitted again, and then transmission is stopped for T frames. Such a sequence of operations is repeated. Here, T is a natural number determined in advance.

A situation wherein a sequence of operations that a postamble signal and a background noise updating signal are transmitted and then transmission is stopped for a period of T frames is repeated in this manner is referred to as "pause processing state". However, even in a pause processing state in which transmission is stopped, the speech burst period detection portion 3 always performs detection of a speech burst period, and if a speech burst is detected, then a frame called preamble signal is produced by the preamble production portion 8. Then, the preamble signal is transmitted from the transmission antenna 11 via the data switching portion 10, and in the following frames to the preamble signal, high efficiency codes produced by the high efficiency coding portion 14 are successively transmitted.

The postamble signal and the preamble signal are signals which are not normally produced by the high efficiency coding portion 14, and those postamble signal and preamble signal are collectively called "unique words".

FIG. 2 is a block diagram showing a construction of a speech decoding apparatus, that is, an apparatus on the reception side. The speech decoding apparatus 92 shown is used in pair with the speech coding apparatus 91 shown in FIG. 1.

A reception antenna 20 is connected to the speech decoding apparatus 92 via a reception circuit 33. The reception antenna 20 is provided to receive a signal transmitted from the speech coding apparatus 91 (FIG. 1). Further, in order to output decoded speech, a loudspeaker 30 is connected to the speech decoding apparatus 92.

In the speech decoding apparatus 92, a reception signal inputted from the reception antenna 20 via the reception circuit 33 is supplied to a high efficiency speech decoding portion 22 which effect high efficiency speech decoding, a unique word detection portion 23 as which detects a unique word, and a background noise parameter storage portion 24 which holds parameters necessary for production of background noise. The speech decoding apparatus 92 further includes a background noise synthesis portion 29 for synthesizing background noise, and a switch 21 for selectively outputting background noise outputted from the background noise synthesis portion 29 or decoded speech from the high efficiency speech decoding portion 22 to the loudspeaker 30. The speech decoding apparatus 92 further includes a quantized spectrum coefficient calculation portion 25 and a random residual signal generation portion 28.

The unique word detection portion 23 analyzes a reception signal and discriminates whether or not each of the current frame and the next frame is a speech burst period or a pause period. If the current frame is a pause period, then the unique word detection portion 23 detects a postamble signal, a preamble signal or a background noise updating signal. The detection method of a speech burst period/pause period by the unique word detection portion 23 is such as described below:

(1) If the preceding frame is a speech burst period and a signal other than the postamble signal is received in the current frame, then the current frame is a speech burst period;

(2) If the preceding frame is a speech burst period and the postamble signal is received in the current frame, then the current frame is a pause period;

(3) If the preceding frame is a pause period and a signal other than the preamble signal is received in the current frame, the current frame is a pause period; and (4) In spite of the three criteria (1) to (3) described above, if the preceding frame is a pause period and the preamble signal is received in the current frame, then the current frame is a pause period and the next frame becomes a speech burst period without fail.

Meanwhile, criteria when the unique word detection portion 23 detects a signal from within a reception signal are such as follows:

(a) If a signal which can be regarded as a postamble signal is received, then a postamble signal is detected whether or not the current frame is a speech burst period or a pause period;

(b) If a signal which can be regarded as a preamble signal is received within a pause period, then a preamble signal is detected;

(c) However, if a signal which can be regarded as a preamble signal is received within a speech burst period, then a speech burst code signal is detected; and (d) If, within a pause period, a postamble signal is detected in the preceding frame and a signal which can be regarded as a preamble signal is not received in the current frame, then a background noise updating signal is detected in the current frame.

A detection output of the unique word detection portion 23 is supplied to the background noise parameter storage portion 24 and is supplied also to the switch 21 for switching of the switch 21. If it is discriminated by the unique word detection portion 23 that the current frame is a speech burst period, then the speech burst code signal is decoded by the high efficiency speech decoding portion 22. Then, the switch 21 is switched so that the decoded speech from the high efficiency speech decoding portion 22 may be outputted from the loudspeaker 30.

Next, operation when it is discriminated by the unique word detection portion 23 that the current frame is a pause period is described.

After it is discriminated that the current frame is a pause period, parameters are read out from the background noise parameter storage portion 24 first. From among the parameters read out, a quantized spectrum coefficient is inputted to the quantized spectrum coefficient calculation portion 25, by which it is converted into a quantized spectrum coefficient, whereafter it is inputted to the background noise synthesis portion 29. The remaining parameters are inputted, except that which corresponds to a residual signal, directly from the background noise parameter storage portion 24 to the background noise synthesis portion 29. The parameter corresponding to the residual signal is not inputted from the background noise parameter storage portion 24 to the background noise synthesis portion 29, but instead, a random residual signal generated by the random residual signal generation portion 28 is inputted to the background noise synthesis portion 29. From the inputs from the background noise parameter storage portion 24, quantized spectrum coefficient calculation portion 25 and random residual signal generation portion 28, the background noise synthesis portion 29 produces a background noise signal. Then, when it is discriminated by the unique word detection portion 23 that the current frame is a pause period, the switch 21 is switched so that the background noise signal produced by the background noise synthesis portion 29 is outputted from the loudspeaker 30.

The background noise parameter storage portion 24 is a memory for holding parameters necessary for synthesis of background noise. If it is discriminated by the unique word detection portion 23 that the reception signal of the current frame is a background noise updating signal, then the background noise updating signal is inputted to the background noise parameter storage portion 24. Consequently, contents of the background noise parameter storage portion 24 are updated to background noise parameters determined based on the background noise updating signal.

In the following, operation of the conventional speech coding and decoding system is described with reference to a flow chart. FIG. 3 illustrates processing of the speech coding apparatus 91 at the transmission site.

Assuming that a speech signal is inputted one after another frame, a spectrum envelope of the speech signal itself is analyzed by the spectrum envelope analysis portion 2 and a spectrum coefficient is calculated first in step 201. This spectrum coefficient (non-quantized spectrum coefficient) is then quantized, in step 202, by the spectrum coefficient quantization portion 6 so that a quantized spectrum coefficient is obtained.

The speech signal for one frame is inputted also to the speech burst period detection portion 3, and in step 203, it is discriminated by the speech burst period detection portion 3 whether or not the current frame is a speech burst period or a pause period. Then, based on the non-quantized spectrum coefficient, the quantized spectrum coefficient and the input speech signal, high efficiency coding is performed by the high efficiency coding portion 14 in step 204.

If it is discriminated in step 203 that the current frame is a speech burst period, then the control sequence advances to step 206, in which the data switching portion 10 selects the high efficiency code outputted from the high efficiency coding portion 14 and this high efficiency code is transmitted toward the decoding apparatus side by the transmission antenna 11.

On the other hand, if it is discriminated in step 203 that the current frame is a pause period, then processing by the unique word production portion 35, that is, the preamble production portion 8 and the postamble production portion 9, is performed in step 205. In particular, in the current frame, a postamble signal is produced by the postamble production portion 9, and in step 206, the postamble signal is transmitted from the transmission antenna 11 via the data switching portion 10. In the next frame, the speech signal of silence inputted from the microphone 1 is high efficiency coded by the high efficiency coding portion 14 in a similar manner as upon high efficiency coding for a speech burst period in step 204, and the resulting code is transmitted from the transmission antenna 11 in step 206.

After a background noise updating signal is transmitted, the speech coding apparatus 91 stops its transmission for a period of T frames which is a predetermined time interval. After the period of T frames passes, the speech coding apparatus 91 transmits a postamble signal and a background noise updating signal again and then stops its transmission for another period of T frames, and such a sequence of operations is repeated.

It is to be noted that, also while transmission is stopped, detection of a speech burst period in step 203 is successively performed, and if transition to a speech burst period from a pause period is detected, then a preamble signal is produced by the preamble production portion 8 included in the unique word production portion 35 in step 205. Then, in the current frame, the preamble signal is transmitted from the transmission antenna 11 via the data switching portion 10 in step 206. Then, in the following frames, high efficiency codes produced by the high efficiency coding portion 14 are successively transmitted in steps 204 and 206.

Next, processing by the speech decoding apparatus 92 at the reception site is described with reference to FIG. 4.

A reception signal transmitted from the coding apparatus and received by the reception antenna 20 is supplied to the high efficiency speech decoding portion 22 and the unique word detection portion 23 via the reception circuit 33. First in step 251, the reception signal is analyzed by the unique word detection portion 23 to discriminate whether or not each of the current frame and the next frame is a speech burst period or a pause period. If it is discriminated that both of the current frame and the next frame are pause periods, then it is discriminated in step 253 whether or not the reception signal is a unique word (that is, a postamble signal or a preamble signal). If the reception signal is not a unique word here, then it is discriminated in step 254 whether or not the reception signal is a background noise updating signal (data for updating of background noise). If it is discriminated in step 254 that the reception signal is a background noise updating signal, then contents of the background noise parameter storage portion 24 are updated in step 255.

If it is discriminated in step 251 that the current frame is a speech burst period, the high efficiency speech decoding portion 22 decodes the reception signal (in this instance, a high efficiency code) to produce a decoded speech signal in step 252, and the switch 21 is switched in step 259 so that the e decoded speech may be outputted from the loudspeaker 30. Then, the decoded speech signal is outputted.

Next, operation when it is discriminated in step 251 by the unique word detection portion 23 that the current frame is a pause period is described.

First, the processing in steps 253, 254 and 255 described above is executed. Then, in step 256, a quantized spectrum code word is read out from the background noise parameter storage portion 24 and inputted to the quantized spectrum coefficient calculation portion 25, by which it is converted into a quantized spectrum coefficient. Then, in step 257, the random residual signal generation portion 28 generates a random residual signal, and in step 258, the background noise synthesis portion 29 produces a background noise signal from the inputs from the background noise parameter storage portion 24, quantized spectrum coefficient calculation portion 25 and random residual signal generation portion 28. Since the current frame is a pause period, the switch 21 is switched to the background noise synthesis portion 29 side so that the background noise signal produced by the background noise synthesis portion 29 is outputted from the loudspeaker 30.

In the conventional speech coding and decoding system described above, however, the codebook provided in the spectrum coefficient quantization portion of the speech coding apparatus is generally optimized for quantization of a spectrum envelope in a speech burst period, but cannot be considered suitable for quantization of a pause period. Since the conventional system quantizes a spectrum envelope in a pause period using such a codebook optimized for a speech burst period as just described, background noise in a pause period gives rise to an unfamiliar feeling. After all, the conventional speech coding and decoding system has a problem in that background noise outputted from the speech decoding apparatus in a pause period makes unnatural sound.

SUMMARY OF THE INVENTION

It is an object of the present invention to provide a speech signal transmission method which is applied to a speech coding and decoding system which performs VOX processing by which background noise is produced and can reduce an unfamiliar feeling of background noise to be outputted on the reception side.

It is another object of the present invention to provide a speech coding and decoding system for performing VOX processing for production of background noise which can reduce an unfamiliar feeling of background noise outputted on the reception side.

The first object of the present invention described above is attained by a speech signal transmission method wherein, on a transmission side, an input speech signal is coded and transmitted as coded data to a reception side, and on the reception side, the coded data are decoded and outputted as an output speech signal. The method includes detecting a pause period of the input speech signal on the transmission side, producing a background noise updating signal by coding the input speech signal in the pause period on the transmission side, calculating a quantized spectrum, a non-quantized spectrum envelope and a quantized spectrum envelope from the input speech signal in the pause period on the transmission side, stopping a transmission for a predetermined period on the transmission side after the background noise updating signal is transmitted from the transmission side to the reception side, and producing, within the predetermined period, background noise based on the background noise updating signal received to output the background noise as an output speech signal on the reception side, wherein when a difference between the non-quantized spectrum envelope and the quantized spectrum envelope is larger than a predetermined threshold value, the quantized spectrum is changed and the background noise updating signal is produced based on the changed quantized spectrum.

The second object of the present invention is attained by a speech coding and decoding system which includes a speech coding apparatus and a speech decoding apparatus and executes VOX (Voice Operated Transmitter) processing of producing background noise, wherein the speech coding apparatus includes spectrum envelope comparison means for quantitatively calculating a difference between a non-quantized spectrum envelope and a quantized spectrum envelope of an input signal to the speech coding apparatus and spectrum envelope changing means for changing the quantized spectrum envelope in response to the difference, and uses the quantized spectrum envelope changed by the spectrum envelope changing means in order to perform coding processing for background noise and then transmits spectrum change information regarding the change of the quantized spectrum envelope to the speech decoding apparatus side, and the speech decoding apparatus includes spectrum change information storage means for storing the received spectrum change information and changed spectrum coefficient calculation means for changing the received quantized spectrum envelope based on the spectrum change information stored in the spectrum change information storage means, and uses, in order to produce background noise, the quantized spectrum outputted from the changed spectrum coefficient calculation means.

The speech coding and decoding system may be constructed such that the speech coding apparatus further includes a first codebook, a second codebook having different contents from those of the first codebook, first spectrum coefficient quantization means for quantizing the input signal in a speech burst period using the first codebook, and second spectrum coefficient quantization means for quantizing the input signal in the pause period using the second codebook.

Here, the "quantized spectrum envelope" signifies a spectrum envelope of speech defined by a quantized spectrum coefficient, and the "non-quantized spectrum envelope" signifies a spectrum envelope of speech defined by a non-quantized spectrum coefficient. Also in the following description, the terms are used in the same meanings.

In the present invention, the spectrum envelope comparison means performs comparison between a non-quantized spectrum envelope and a quantized spectrum envelope in a pause period. The spectrum envelope changing means changes the quantized spectrum envelope in response to a result of the comparison so that the difference between the non-quantized spectrum envelope and the quantized spectrum envelope may be reduced. In a conventional system, since a quantized spectrum coefficient for a pause period is calculated using a quantizer optimized for a speech burst period, the quantized spectrum coefficient and the non-quantized spectrum coefficient in a pause period exhibit a large difference. However, according to the present invention, since the quantized spectrum coefficient is changed by the spectrum envelope changing means, the difference between the quantized spectrum coefficient and the non-quantized spectrum coefficient is reduced, and the sound quality of background noise is improved.

Further, in the present invention, where the speech coding apparatus includes first spectrum coefficient quantization means for quantizing an input signal in a speech burst period using a first codebook and second spectrum coefficient quantization means for quantizing the input signal in a pause period using a second codebook having contents different from those of the first codebook, the second spectrum coefficient quantization means (i.e., a pause period spectrum coefficient quantization portion) performs quantization of a spectrum coefficient using the small codebook (i.e., the second codebook) for a pause period. Thereafter, filtering processing is performed by the spectrum envelope changing means so that the difference from the non-quantized spectrum may be reduced. Consequently, the necessity to perform quantization for a pause period using a large codebook such as a codebook (i.e., the first codebook) for spectrum coefficient quantization for a speech burst period which is used conventionally is eliminated.

The above and other objects, features, and advantages of the present invention will be apparent from the following description based on the accompanying drawings which illustrate examples of preferred embodiments of the present invention.

DESCRIPTION OF THE PREFERRED EMBODIMENTS

First Embodiment

Figure 5:
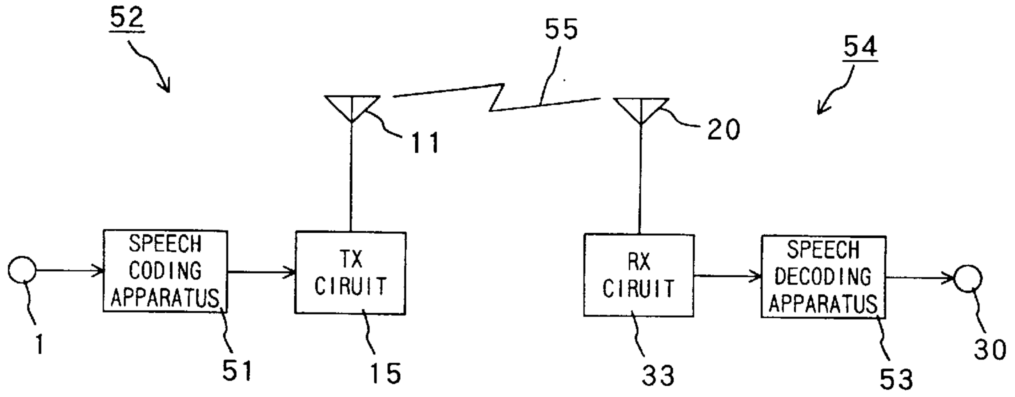
FIG. 5 is a block diagram showing a construction of a speech coding and decoding system of a first embodiment of the present invention.

A speech coding and decoding system of a first embodiment of the present invention shown in FIG. 5 is constructed such that a transmission site 52 at which a speech coding apparatus 51 is provided and a reception site 54 at which a speech decoding apparatus 53 is provided are connected to each other by a radio channel 55 so that a coded speech signal is transmitted by digital radio transmission. A microphone 1 as an input terminal of a speech signal is provided at the transmission site 52. The microphone 1 is connected to an input terminal of the speech coding apparatus 51. A transmission circuit 15 is provided on the output side of the speech coding apparatus 51, and a coded signal from the speech coding apparatus 51 is converted into a radio signal by the transmission circuit 15 and transmitted from a transmission antenna 11 to the reception site 54. The transmission circuit 15 stops its operation when no signal is outputted from the speech coding apparatus 51 in order to reduce the power required for radio transmission.

The reception site 54 includes a reception circuit 33 for receiving and detecting a radio signal inputted to a reception antenna 20, and an output of the reception circuit 33 is inputted to the speech decoding apparatus 53. In order to output a speech signal decoded by the speech decoding apparatus 53, a loudspeaker 30 is connected to an output terminal of the speech decoding apparatus 53.

First, a construction of the speech coding apparatus 51 provided at the transmission site 52 is described with reference to FIG. 6.

Figure 1:
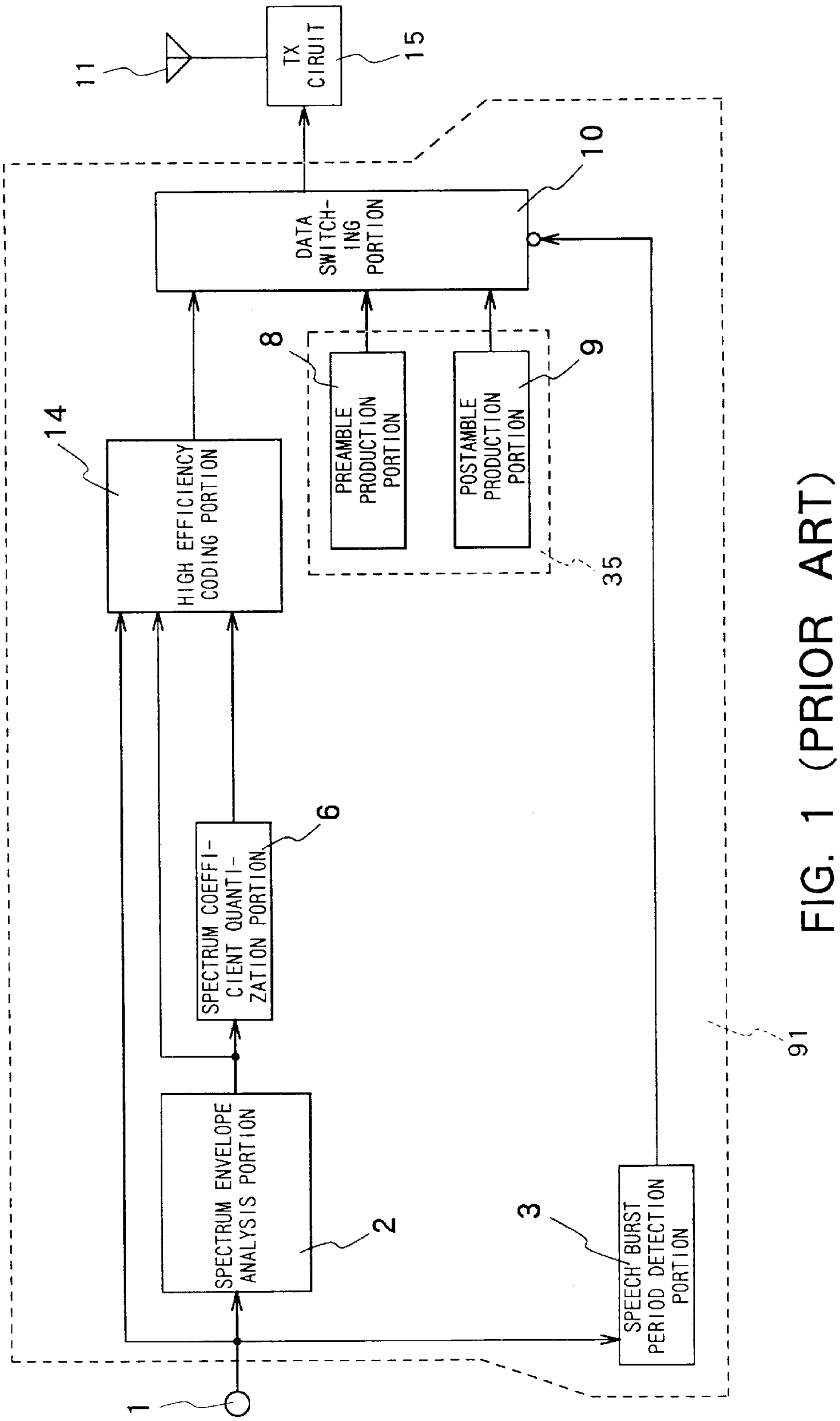
FIG. 1 (PRIOR ART)
FIG. 1 is a block diagram showing an example of a construction of a speech coding apparatus of a conventional speech coding and decoding system.

The speech coding apparatus 51 is different from the speech coding apparatus 91 of the conventional system shown in FIG. 1 in that it includes, in place of the high efficiency coding apparatus, another high efficiency coding portion 7 which effects high efficiency coding not only for a speech burst period but also for a pause period and it includes, in addition to the components of the speech coding apparatus shown in FIG. 1, a spectrum envelope comparison portion 4 for calculating a difference between a spectrum envelope by a non-quantized spectrum coefficient and another spectrum envelope by a quantized spectrum coefficient and a spectrum envelope changing portion 5 for changing the quantized spectrum envelope in accordance with a result of comparison by the spectrum envelope comparison portion 4. Also the changed quantized spectrum envelope outputted from the spectrum envelope changing portion 5 is inputted to the high efficiency coding portion 7. In FIG. 6, those elements denoted by same reference numerals as those shown in FIG. 1 are same functional blocks as those shown in FIG. 1.

Figure 6:
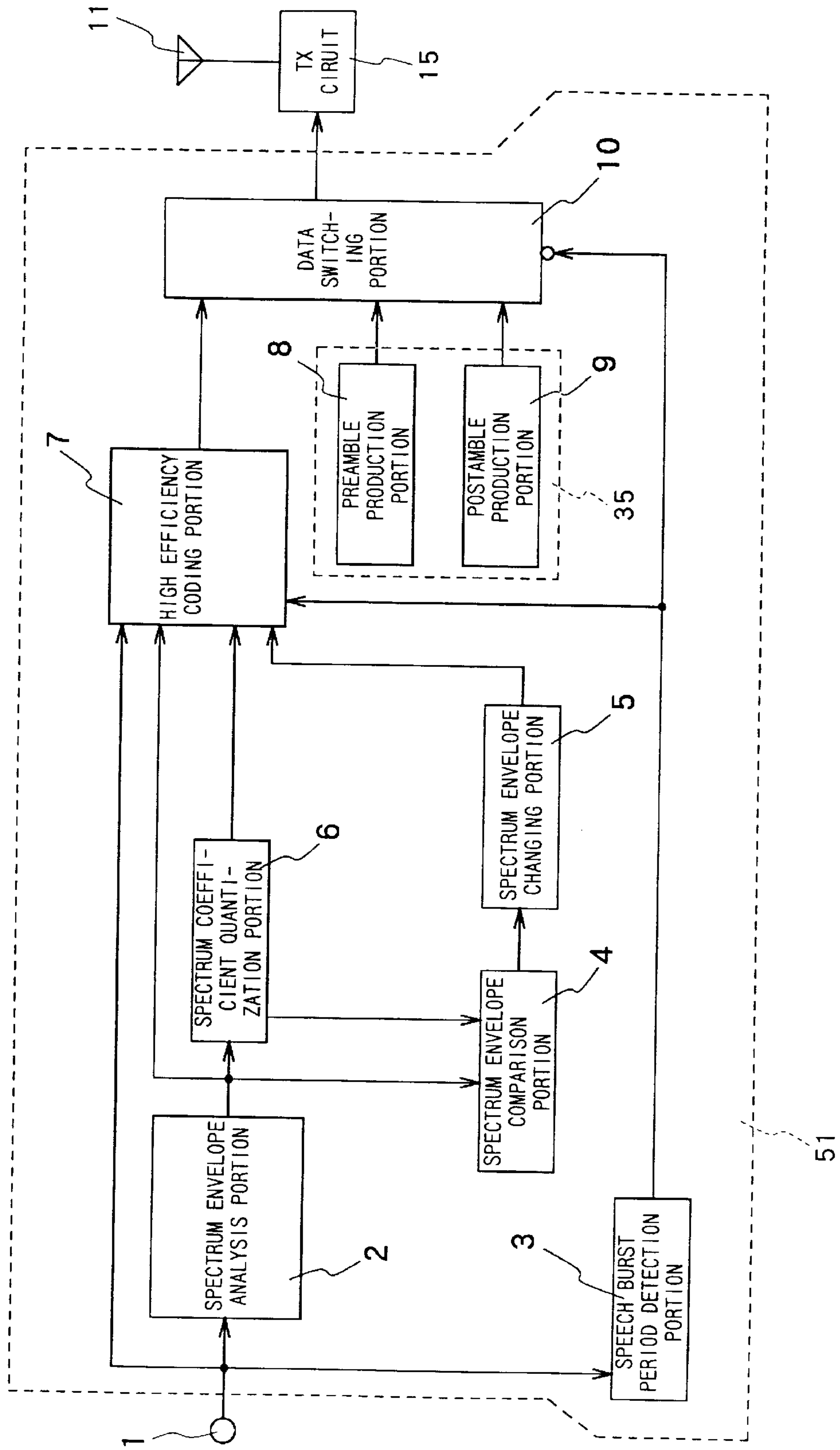
FIG. 6 is a block diagram showing a construction of a speech coding apparatus of the speech coding and decoding system of the first embodiment.

In the speech coding apparatus 51 shown in FIG. 6, similarly as in the conventional coding apparatus shown in FIG. 1, an original speech signal inputted to the microphone 1 is inputted for each frame to the spectrum envelope analysis portion 2, speech burst period detection portion 3 and high efficiency coding portion 7. The frame length is, for example, 40 ms. A spectrum envelope of the original speech signal itself for one frame is analyzed and a spectrum coefficient (non-quantized spectrum coefficient) is calculated by the spectrum envelope analysis portion 2. Here, the spectrum coefficient may be a linear prediction coefficient, a PARCOR coefficient or a LSP. Then, the non-quantized spectrum coefficient is quantized by the spectrum coefficient quantization portion 6 to obtain a quantized spectrum coefficient. Meanwhile, the speech burst period detection portion 3 discriminates whether or not the current frame is a speech burst period within which sound is issued or a pause period within which no sound is issued.

The constructions and operations of the microphone 1, spectrum envelope analysis portion 2, spectrum coefficient quantization portion 6 and speech burst period detection portion 3 described above are similar to those of the speech coding apparatus of the conventional system shown in FIG. 1.

The high efficiency coding portion 7 which executes high efficiency coding produces, when information that the current frame is a speech burst period is inputted thereto from the speech burst period detection portion 3, a high efficiency code using the original speech signal inputted from the microphone 1, the non-quantized spectrum coefficient produced by the spectrum envelope analysis portion 2 and the quantized spectrum coefficient produced by the spectrum coefficient quantization portion 6. In other words, an input from the spectrum envelope changing portion 5 which will be hereinafter described is not used for high efficiency coding for a speech burst period at all. A combination of a quantized spectrum code word and the high efficiency code determined from the original speech signal, the non-quantized spectrum coefficient and the quantized spectrum coefficient is outputted, within a speech burst period, as a speech burst code signal from the high efficiency coding portion 7. Then, when the current frame is a speech burst period, the data switching portion 10 selects the speech burst code signal outputted from the high efficiency coding portion 7. Consequently, this speech burst code signal is outputted from the speech coding apparatus 51 and transmitted from the transmission antenna 11 toward the reception site 54.

On the other hand, if it is discriminated that the preceding frame is a speech burst period and the current frame is a pause period, the following processing is performed. First, in the current frame, the postamble production portion 9 produces a postamble signal, and this postamble signal is outputted via the data switching portion 10. The outputted postamble signal is transmitted to the reception site 54 via the transmission circuit 15 and the transmission antenna 11. The construction and the operation of the postamble production portion 9 are similar to those of the conventional speech coding apparatus shown in FIG. 1. In the next frame, a speech signal of silence inputted from the microphone 1 is high efficiency coded in such a manner as described below by the high efficiency coding portion 7, and the code is outputted as a background noise updating signal from the speech coding apparatus 51. This background noise updating signal is transmitted from the transmission antenna 11 to the reception site 54.

While, in the conventional speech coding apparatus shown in FIG. 1, the method of producing a high u$i, efficiency code for a speech burst period and the method of producing a background noise updating signal by the high efficiency coding portion 14 are same as each other, the high efficiency coding portion 7 of the speech coding apparatus 51 of the embodiment shown in FIG. 6 produces a high efficiency code for a speech burst period and a background noise updating signal by different production methods. The speech coding apparatus 51 includes the spectrum envelope comparison portion 4 and the spectrum envelope changing portion 5, and using outputs of them, a background noise updating signal is produced by a method different from that for a high efficiency code for a speech burst period. First, the spectrum envelope comparison portion 4 and the spectrum envelope changing portion 5 are described.

The spectrum envelope comparison portion 4 compares a non-quantized spectrum envelope calculated from the non-quantized spectrum coefficient obtained by the spectrum envelope analysis portion 2 and a quantized spectrum envelope calculated from the quantized spectrum coefficient obtained by the spectrum coefficient quantization portion 6 with each other to calculate a difference between them. Further, the spectrum envelope changing portion 5 receives the difference calculated by the spectrum envelope comparison portion 4 and compares the difference with a threshold value. If the spectrum envelope changing portion 5 discriminates that the quantized spectrum envelope and the non-quantized spectrum envelope are much different from each other, then it changes the quantized spectrum coefficient obtained by the spectrum coefficient quantization portion 6 so as to decrease the difference of the same from the non-quantized spectrum envelope. Then, the spectrum envelope changing portion 5 inputs the quantized spectrum coefficient thus changed and information regarding the changing method to the high efficiency coding portion 7. In the following description, the quantized spectrum coefficient changed is referred to as "changed quantized spectrum coefficient" and the information regarding the changing method is referred to as "spectrum change information".

The high efficiency coding portion 7 produces a high efficiency code using the original speech signal inputted from the microphone 1, the non-quantized spectrum coefficient produced by the spectrum envelope analysis portion 2 and the changed quantized spectrum produced by the spectrum envelope changing portion 5. Further, a code word of the quantized spectrum coefficient obtained by the spectrum coefficient quantization portion 6 and a code word of the spectrum change information produced by the spectrum envelope changing portion 5 are added to the high efficiency code to produce a background noise updating signal. The background noise updating signal produced by the high efficiency coding portion 7 in this manner is inputted to the data switching portion 10 and transmitted via the transmission circuit 15 and the transmission antenna 11.

After the background noise updating signal is transmitted, the transmission site 52 stops its transmission for a predetermined period of time of T frames. Then, after the T frames, the transmission site 52 transmits a postamble signal and a background noise updating signal again, and then stops its transmission for a period of T frames. This sequence of operations is repeated.

However, also while the transmission is stopped, the speech coding apparatus 51 continuously performs detection of a speech burst period by means of the speech burst period detection portion 3, and when it is discriminated that the current frame is a speech burst period, a preamble signal is produced by the preamble signal production portion 8. As a result, this preamble signal is outputted from the speech coding apparatus 51 via the data switching portion 10 and transmitted to the transmission circuit 15 and the transmission antenna 11. Then, in the following frames, speech burst code signals produced by the high efficiency coding portion 7 are successively outputted from the speech coding apparatus 51. Consequently, the speech burst code signals are successively transmitted by the transmission circuit 15 and the transmission antenna 11. The construction and the operation of the preamble production portion 8 are same as those of the conventional speech coding apparatus shown in FIG. 1.

Figure 2:
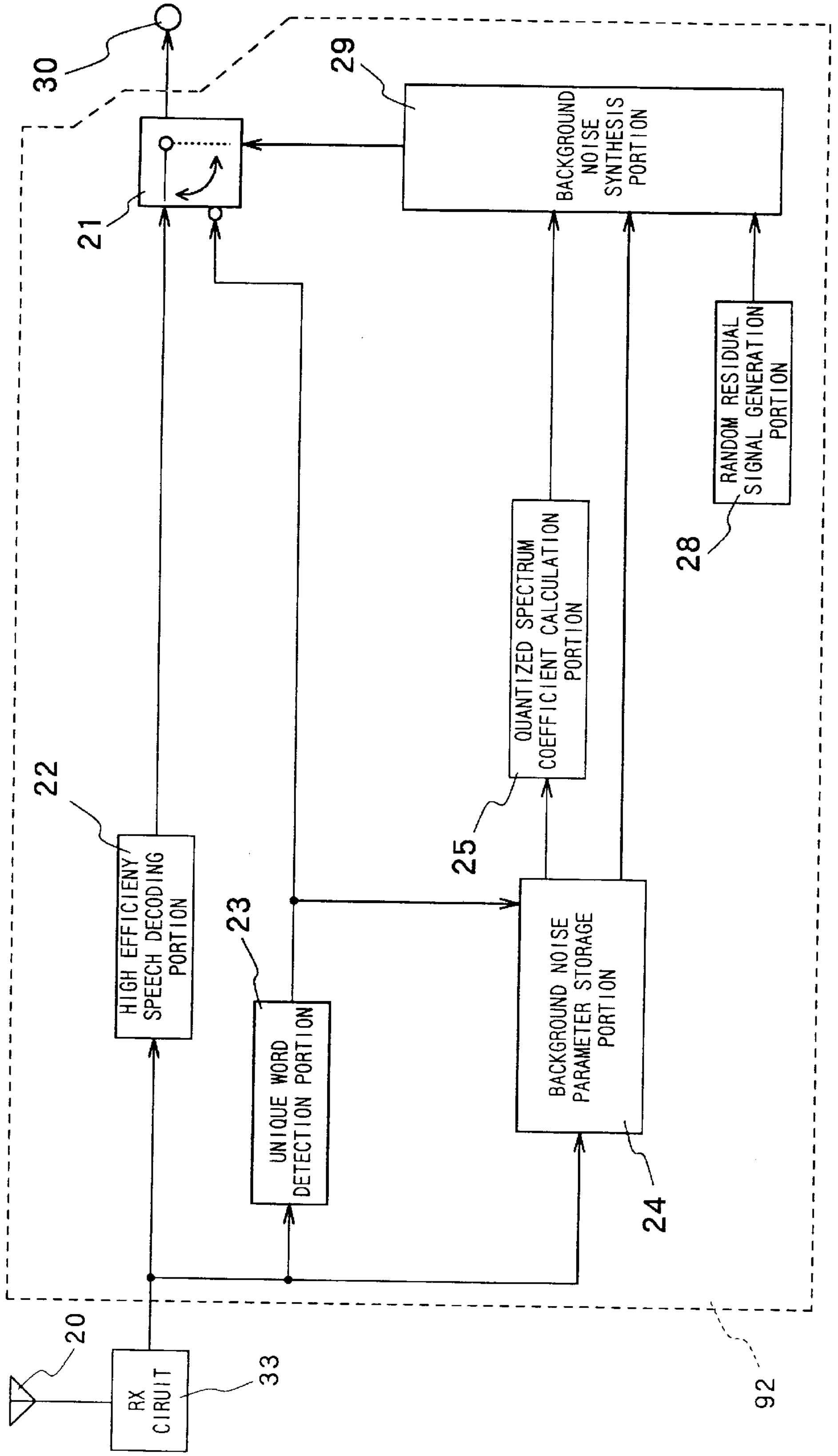
FIG. 2 (PRIOR ART)
FIG. 2 is a block diagram showing an example of a construction of a speech decoding apparatus of a conventional speech coding and decoding system.
Figure 3:
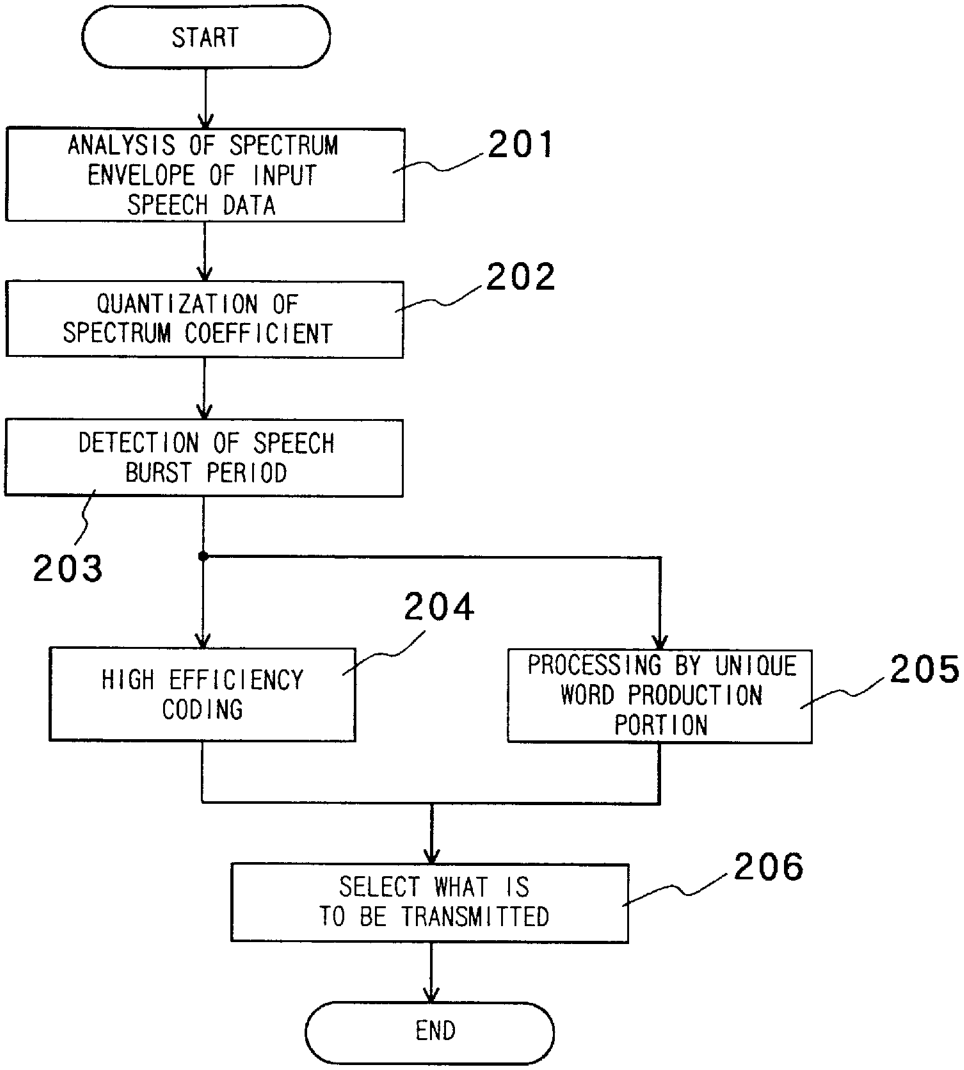
FIG. 3 (PRIOR ART)
FIG. 3 is a flow chart illustrating operation of the speech coding apparatus shown in FIG. 1.
Figure 4:
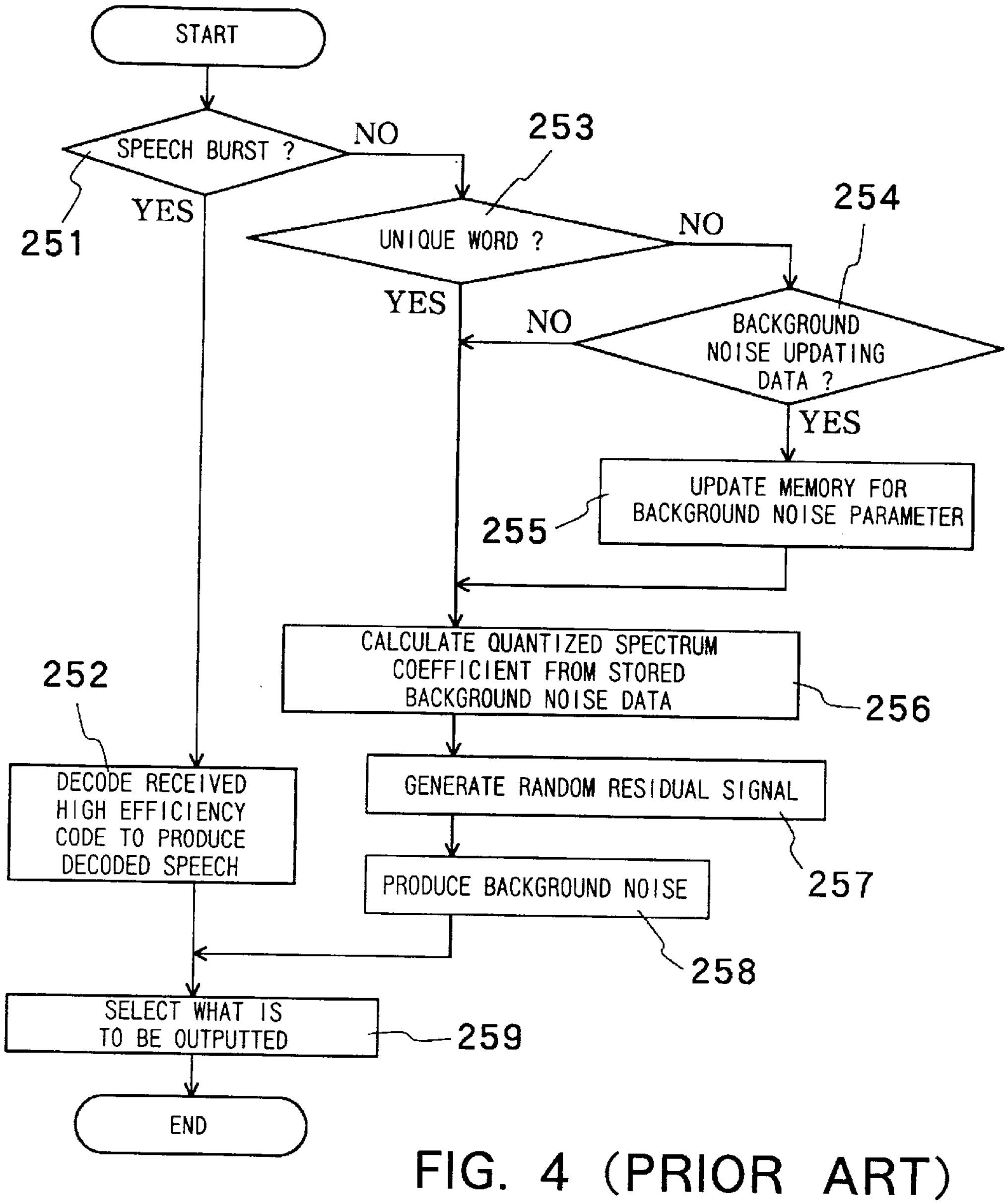
FIG. 4 (PRIOR ART)
FIG. 4 is a flow chart illustrating operation of the speech decoding apparatus shown in FIG. 2.
Figure 7:
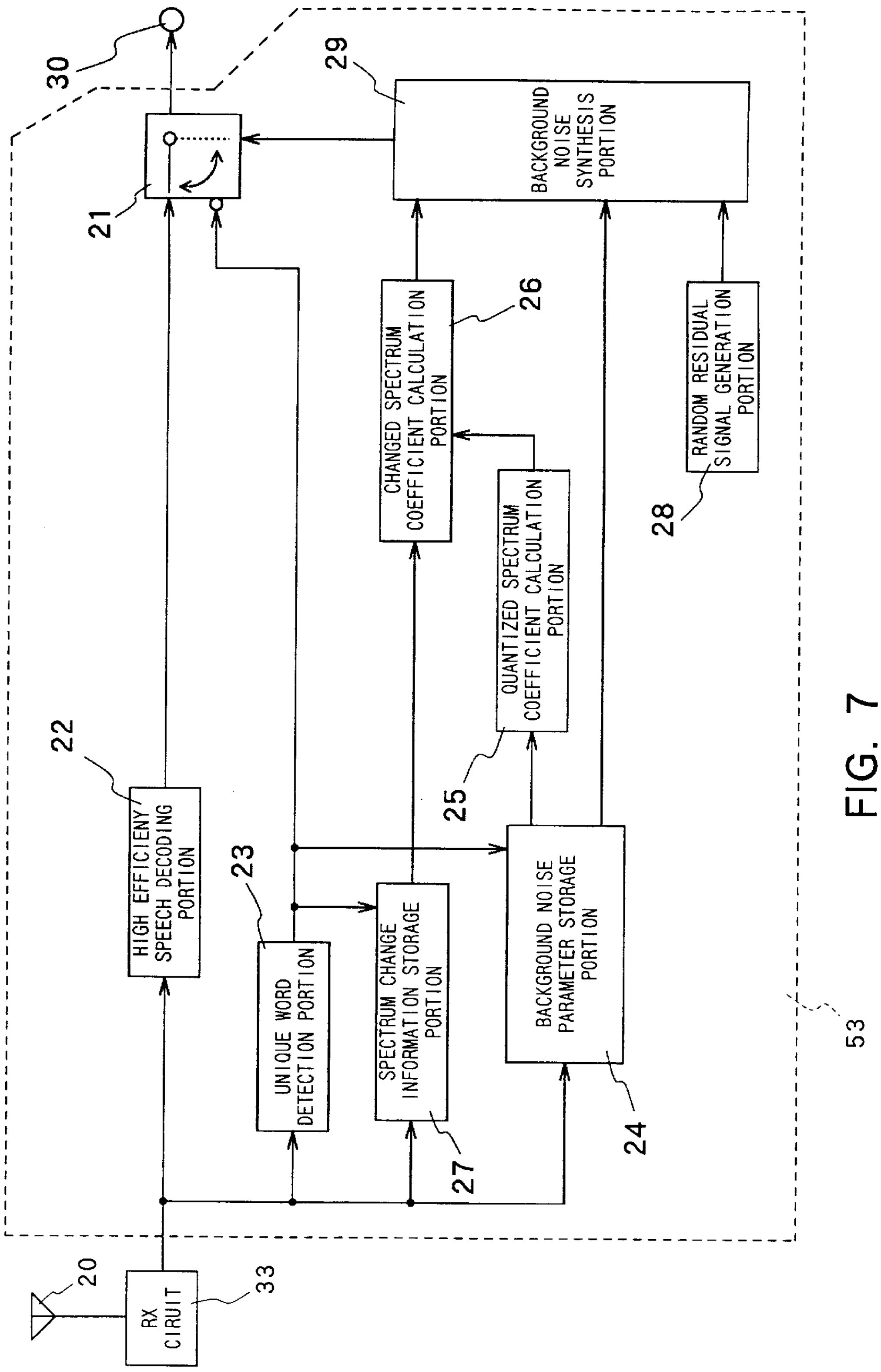
FIG. 7 is a block diagram showing a construction of a speech decoding apparatus of the speech coding and decoding system of the first embodiment.

Next, a construction of the speech decoding apparatus 53 is described with reference to FIG. 7. The speech decoding apparatus 53 includes, in addition to the components of the speech decoding apparatus of the conventional system shown in FIG. 2, a spectrum change information storage portion 27 for receiving a reception signal and a result of detection by the speech burst period detection portion 3 and storing spectrum change information and a changed spectrum coefficient calculation portion 26 for receiving a quantized spectrum coefficient from the quantized spectrum coefficient calculation portion 25 and changing the inputted quantized spectrum coefficient in accordance with the spectrum change information stored in the spectrum change information storage portion 27. An output of the quantized spectrum coefficient calculation portion 25 is not inputted directly to the background noise synthesis portion 29, but instead, an output of the changed spectrum coefficient calculation portion 26 is inputted to the background noise synthesis portion 29. In FIG. 7, those elements denoted by same reference numerals as those shown in FIG. 2 are same functional blocks as those shown in FIG. 2.

A reception signal inputted to the reception antenna 20 and received and detected by the reception circuit 33 is inputted to the high efficiency speech decoding portion 22, unique word detection portion 23, background noise parameter storage portion 24 and spectrum change information storage portion 27. The unique word detection portion 23 analyzes the reception signal and discriminates whether or not each of the current frame and the next frame is a speech burst period or a pause period. When the current frame or the next frame is a pause period, a postamble signal, a preamble signal or a background noise updating signal is detected. The construction and operation of the unique word detection portion 23 are same as those of the conventional speech decoding apparatus shown in FIG. 2, and also the discrimination method between a speech burst period and a pause period and the detection method for a postamble signal, a preamble signal or a background noise updating signal are same as those of the conventional system described above.

If it is discriminated by the unique word detection portion 23 that the current frame is a speech burst period, then a speech burst code signal is decoded by the high efficiency speech decoding portion 22. Then, the switch 21 is switched so as to select the high efficiency speech decoding portion 22, and decoded sound from the high efficiency speech decoding portion 22 is outputted as an output of the speech decoding apparatus 53 from the loudspeaker 30. The constructions and operations of the high efficiency speech decoding portion 22 and the loudspeaker 30 are similar to those of the conventional apparatus shown in FIG. 2.

In the following, operation when it is discriminated by the unique word detection portion 23 that the current frame is a pause period is described.

In a pause period, necessary information is read out from two storage elements in which parameters necessary for synthesis of background noise are held, that is, the spectrum change information storage portion 27 and the background noise parameter storage portion 24, and background noise is synthesized by the background noise synthesis portion 29 using the extracted information. In a pause period, parameters are read out from the background noise parameter storage portion 24 first. Of the parameters read out, the quantized spectrum code word is inputted to the quantized spectrum coefficient calculation portion 25, by which it is converted into a quantized vector coefficient, whereafter it is inputted to the changed spectrum coefficient calculation portion 26. The remaining parameters are inputted directly from the background noise parameter storage portion 24 to the background noise synthesis portion 29 except that part which corresponds to a residual signal. It is to be noted that, similarly as in the conventional speech decoding apparatus described hereinabove, the contents held in the background noise parameter storage portion 24 are updated, only when it is discriminated by the unique word detection portion 23 that the reception signal of the current frame is a background noise updating signal, to background noise parameters calculated based on the background noise updating signal.

The spectrum change information storage portion 27 is used to hold and output spectrum change information to be used for background noise updating. The spectrum change information held in the spectrum change information storage portion 27 is updated only when it is discriminated by the unique word detection portion 23 that the current frame is a background noise updating signal, and in this instance, spectrum change information is extracted from the reception signal and the old spectrum change information held till then is updated with the extracted spectrum change information.

The changed spectrum coefficient calculation portion 26 is used to calculate a changed spectrum coefficient. The changed spectrum coefficient calculation portion 26 combines the quantized spectrum coefficient calculated by the quantized spectrum coefficient calculation portion 25 to the spectrum change information held in the spectrum change information storage portion 27 to calculate a changed quantized spectrum information and inputs the changed quantized spectrum information to the background noise synthesis portion 29.

As a parameter corresponding to the residual signal, a random residual signal generated by the random residual signal generation portion 28 is inputted. The construction and operation of the random residual signal generation portion 28 are similar to those of the conventional speech decoding apparatus shown in FIG. 2.

The background noise synthesis portion 29 generates a background noise signal from inputs from the background noise parameter storage portion 24, changed spectrum coefficient calculation portion 26 and random residual signal generation portion 28. If it is discriminated by the unique word detection portion 23 that the current frame is a pause period, the switch 21 is switched so as to select the background noise synthesis portion 29, and consequently, the background noise signal produced by the background noise synthesis portion 29 is outputted from the loudspeaker 30.

Figure 8:
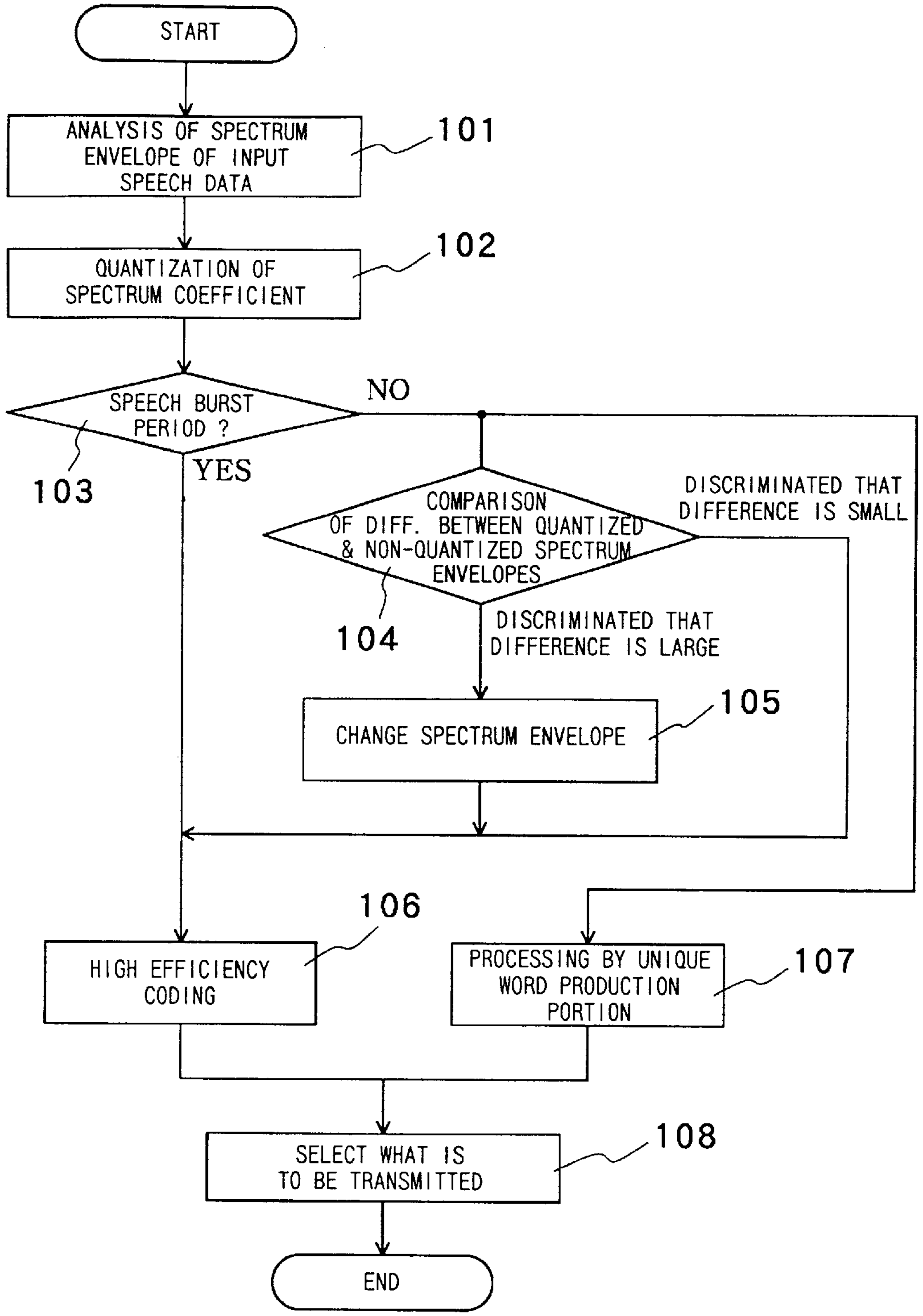
FIG. 8 is a flow chart illustrating operation of the speech coding apparatus shown in FIG. 6.

In the following, operation of the speech coding and decoding system of the first embodiment is described with reference to flow charts. FIG. 8 illustrates processing of the speech coding apparatus 51 of the transmission site 52.

An original speech signal for one frame inputted to the microphone 1 is inputted, in step 101, to the spectrum envelope analysis portion 2, by which a non-quantized spectrum envelope and a non-quantized spectrum coefficient are calculated. The non-quantized spectrum coefficient is inputted, in step 102, to the spectrum coefficient quantization portion 6, which then refers to the spectrum coefficient quantization code book provided in the spectrum coefficient quantization portion 6 to determine a quantized spectrum envelope, a quantized spectrum coefficient and a code word corresponding to the quantized spectrum coefficient.

The speech burst period detection portion 3 analyzes the inputted original speech signal and discriminates, in step 103, whether or not the current frame is a speech burst period or a pause period. If it is discriminated that the current frame is a speech burst period, then the control sequence advances to step 106, in which high efficiency coding is performed. The high efficiency coding is performed as the original speech signal, the non-quantized spectrum coefficient, the quantized spectrum coefficient and the quantized spectrum code word are inputted to the high efficiency coding element 7, and the high efficiency code obtained is outputted from the speech coding apparatus 51 through the data switching portion 10 and transmitted from the transmission antenna 11 in step 108.

On the other hand, the processing when it is discriminated in step 103 that the current frame is a pause period proceeds in the following manner. First, in step 104, the non-quantized spectrum envelope calculated by the spectrum envelope analysis portion 2 and the quantized spectrum envelope calculated by the spectrum coefficient quantization portion 6 are compared with each other by the spectrum envelope comparison portion 4 to discriminate whether the difference between them is large or small. This discrimination is performed by comparison between the difference between them and a predetermined threshold value. Then, if it is discriminated that the difference is large, then the spectrum envelope changing portion 5 calculates, in step 105, a changed quantized spectrum coefficient which has been changed so as to approach the non-quantized spectrum envelope. Thereafter, high efficiency coding is performed by the high efficiency coding portion 7, in step 106, using, when it was discriminated in step 104 that the difference between the spectrum envelopes is large, the changed quantized spectrum coefficient, but using, when it was discriminated in step 104 that the difference between the spectrum envelopes is small, the quantized spectrum coefficient. Then, the high efficiency code, the code word of the quantized spectrum coefficient and the spectrum change information are outputted collectively as a background noise updating signal.

Further, when it is discriminated in step 103 that the current frame is a pause period, a preamble signal is produced by the preamble production portion 8 and a postamble signal is produced by the postamble production portion 9 in step 107 in a substantially simultaneous parallel relationship to steps 104 and 105 described above. The preamble signal and the postamble signal are inputted to the data switching portion 10. Then, when the current frame is a pause period, the data switching portion 10 selects a signal to be outputted in the current frame in step 108. More particularly, (1) in a frame in which a background noise updating code is to be issued, the background noise updating signal obtained by the high efficiency coding portion 7 is selected, but (2) in a frame in which a preamble signal is to be issued, the preamble signal produced by the preamble production portion 8 is selected, or (3) in a frame in which a postamble signal is to be issued, the postamble signal produced by the postamble production portion 9 is selected. The signal selected in this manner is outputted from the speech coding apparatus 51 and transmitted from the transmission circuit 15 and the transmission antenna 11 toward the reception site 54.

Figure 9:
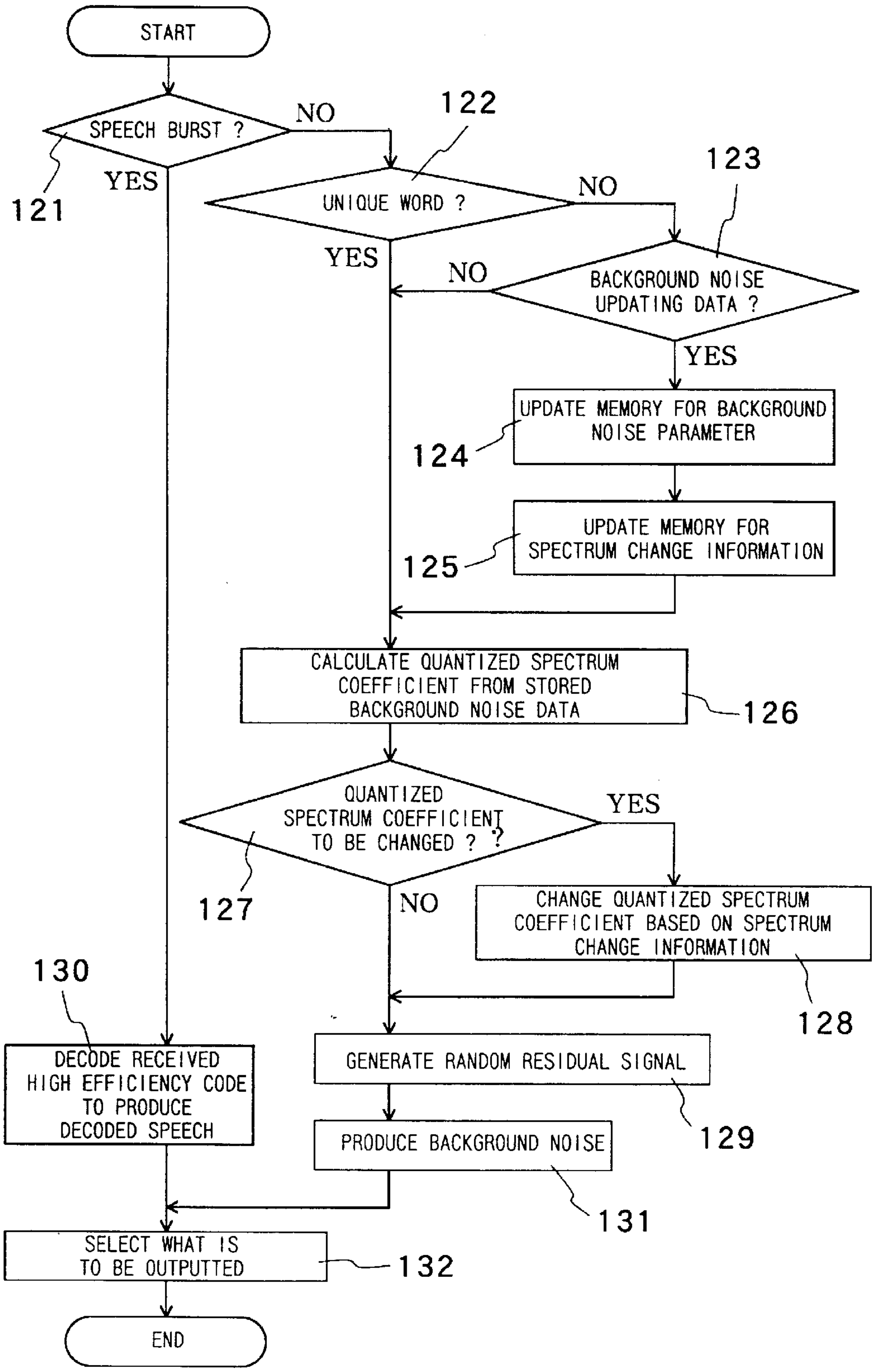
FIG. 9 is a flow chart illustrating operation of the speech decoding apparatus shown in FIG. 7.

Next, processing of the speech decoding apparatus 53 of the reception site 54 is described with reference to FIG. 9.

A reception signal inputted to the reception antenna 20 and received and detected by the reception circuit 33 is inputted to the unique word detection portion 23, by which it is discriminated whether or not the current frame is a speech burst period or a pause period in step 121. If the current frame is a speech burst period, then the received high efficiency code is decoded by the high efficiency speech decoding portion 22 in step 130, and the decoded sound is selected by the switch 21 in step 132. As a result, the decoded sound is outputted from the loudspeaker 30.

On the other hand, if it is discriminated in step 121 that the current frame is a pause period, then it is discriminated in step 122 by the unique word detection portion 23 whether or not the received signal is a unique word such as a postamble signal or a preamble signal. If the received signal is not a unique word, then it is discriminated in step 123 whether or not the received signal is a background noise updating signal (data for background noise updating). When it is discriminated in step 122 that the received signal is a unique word or when it is discriminated in step 123 that the received signal is not background noise updating data, the control sequence advances to step 126. If it is discriminated in step 123 that the received signal is a background noise updating signal, then the background noise parameters held in the background noise parameter storage portion 24 are updated with a background noise parameter and spectrum change information obtained from the newly received background noise updating signal in step 124, and then, the spectrum change information stored in the spectrum change information storage portion 27 is updated in step 125, whereafter the control sequence advances to step 126.

In step 126, the quantized spectrum coefficient calculation portion 25 calculates a quantized spectrum coefficient using the data stored in the background noise parameter storage portion 24. The quantized spectrum coefficient calculated is inputted to the changed spectrum coefficient calculation portion 26 together with the spectrum change information stored in the spectrum change information storage portion 27. Here, based on the spectrum change information, it is discriminated in step 127 whether or not the quantized spectrum coefficient should be changed. If it is necessary to change the quantized spectrum coefficient, then it is changed in accordance with the spectrum change information to calculate a changed quantized spectrum coefficient in step 128.

Then, in step 129, a random residual signal is produced by the random residual signal generation portion 28, and in step 131, the background noise parameter stored in the background noise parameter storage portion 24, the changed quantized spectrum coefficient calculated by the changed spectrum coefficient calculation portion 26 or the quantized spectrum coefficient calculated by the quantized spectrum coefficient calculation portion, and the random residual signal mentioned above are inputted to the background noise synthesis portion 29, by which background noise is produced. Here, the changed quantized spectrum coefficient is used when the quantized spectrum is changed in step 128, but the quantized spectrum coefficient is used when it is discriminated in step 127 that the quantized spectrum should not be changed. When the current frame is a pause period, since the background noise is selected by the switch 21, the background noise is outputted from the loudspeaker 30 in step 132.

Figure 10:
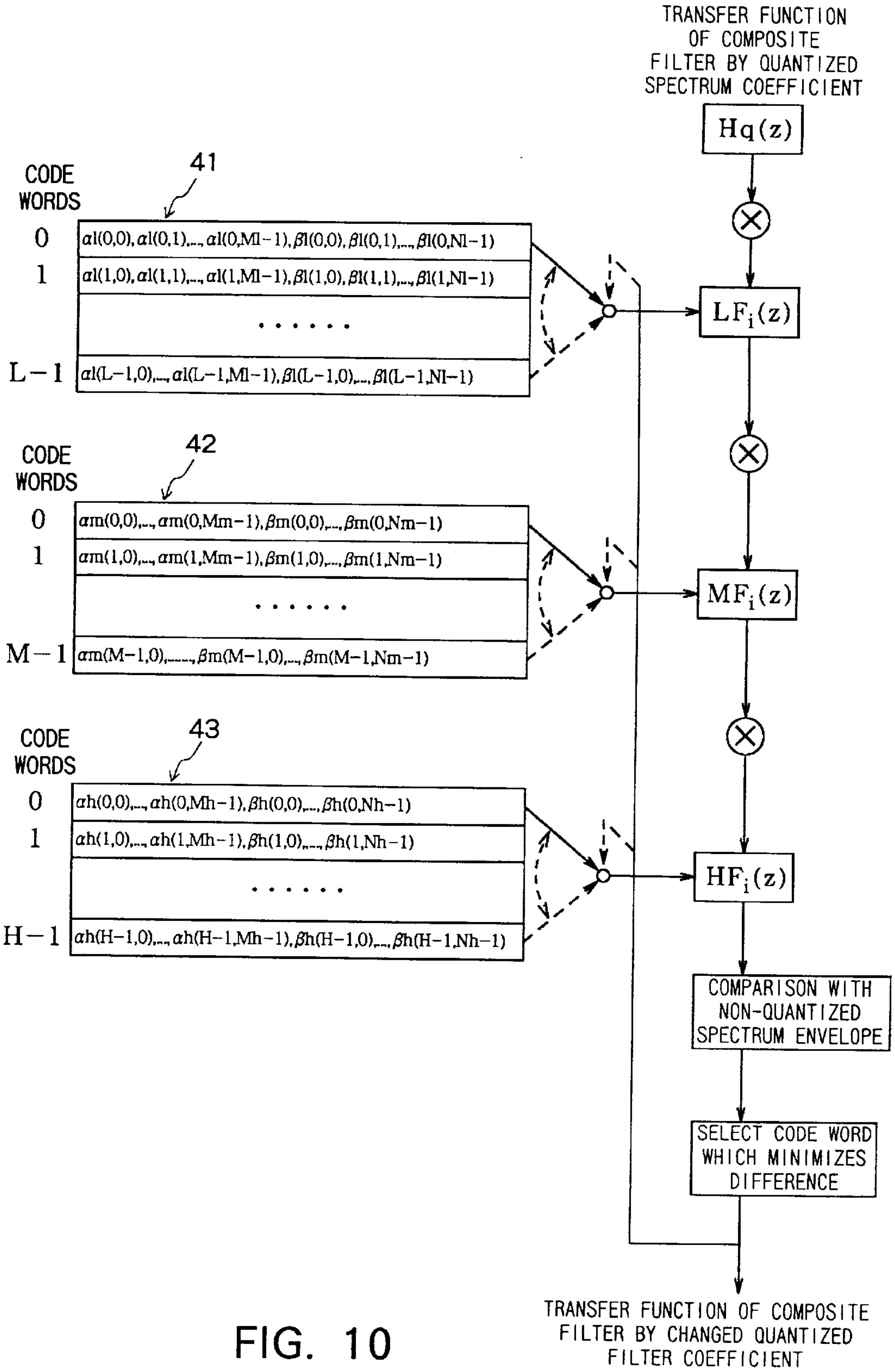
FIG. 10 is a diagrammatic view illustrating an example of processing by a spectrum envelope changing portion.

In the following, an example of processing by the spectrum envelope changing portion 5 of the speech coding apparatus 51 shown in FIG. 6 is described with reference to FIG. 10.

A frequency region in which the quantized vector envelope is present is divided into a low frequency region, a middle frequency region and a high frequency region in a frequency ascending order, and the spectrum envelope changing portion 5 has coefficients of filters whose frequency characteristics are changed only for the individual frequency regions in the form of three code books, that is, a low frequency region changing filter coefficient code book 41, a middle frequency region changing filter coefficient code book 42 and a high frequency region changing filter coefficient code book 43. Then, the spectrum envelope changing portion 5 multiplies a transfer function of a composite filter provided by the quantized spectrum filter by filters produced from filter coefficients selected from within the individual frequency regions to change the quantized spectrum envelope. Then, the quantized spectrum envelopes obtained by the changing are compared with the non-quantized spectrum envelope, and those code works which minimize the difference are selected.

In the following, processing of the speech coding and decoding system where the spectrum envelope changing portion 5 described above is used is described using mathematical expressions.

A non-quantized spectrum envelope and a non-quantized spectrum coefficient of an original speech signal for one frame calculated by the spectrum envelope analysis portion 2 in step 101 are individually represented as follows:

non-quantized spectrum coefficient: nqa(n)

$$(0 \leqq n < N_p) \tag{1}$$

non-quantized spectrum envelope: nqsp(f)

$$(0 \leqq f < f_s) \tag{2}$$

where $f_s$ is the sampling frequency when analog to digital conversion is performed for the original speech signal, and $N_p$ is the degree of the non-quantized spectrum coefficient. It is to be noted that also the degree of the quantized spectrum coefficient is $N_p$. Here, as an example of the non-quantized spectrum coefficient, a linear prediction coefficient mentioned above is used. Consequently, the transfer function H(z) of a composite filter provided by the non-quantized spectrum coefficient nqa(n) is represented as follows:

$$H(z) = \frac{1}{1 - \sum_{i=0}^{N_p - 1} nqa(i) \times z^{-i}} \tag{3}$$

where the non-quantized spectrum envelope nqsp(f) is represented as follows:

$$nqsp(f) = |H(e^{j2\pi f T_s})| \tag{4}$$

$$T_s = \frac{1}{f_s} \tag{5}$$

where e is the base of logarithm, and j is the imaginary unit.

In step 102, the non-quantized spectrum coefficient nqa(n) is inputted to and quantized by the spectrum coefficient quantization portion 6 so that a quantized spectrum coefficient and a code word of a code book corresponding to the quantized spectrum coefficient are calculated. Further, also a quantized spectrum envelope is obtained from the quantized spectrum coefficient. Then are represented in the following manner:

quantized spectrum coefficient: qa(n)

$$(0 \leqq n < N_p) \tag{6}$$

quantized spectrum envelope: qsp(f)

$$(0 \leqq f < f_s) \tag{7}$$

code word of quantized spectrum coefficient:qcode(i)

$$(0 \leqq i < Ni) \tag{8}$$

Similarly to the non-quantized spectrum coefficient, also for the quantized spectrum coefficient, for example, a linear prediction coefficient mentioned hereinabove is used. Consequently, the transfer function Hq(z) of a composite filter by the quantized spectrum coefficient qa(n) is represented as follows:

$$Hq(z) = \frac{1}{1 - \sum_{i=0}^{N_p - 1} qa(i) \times z^{-i}} \tag{9}$$

In this instance, the non-quantized spectrum envelope qsp(f) is represented in the following manner:

$$qsp(f) = |Hq(e^{j2\pi f T_s})| \tag{10}$$

If it is discriminated in step 103 that the current frame is a speech burst period, then a high efficiency code is produced by the high efficiency coding portion 7 in step 106, and this high frequency code is outputted from the transmission antenna 11 via the data switching portion 10 in step 108. For the high efficiency coding method which is used by the pause period high efficiency coding portion 7, a VSELP (Vector Sum Excited LPC) recited, for example, in Kazunori Ozawa, "High Efficiency Speech Coding Technique for Digital Radio Mobile Communication", Triceps, Apr. 6, 1992 (hereinafter referred to as "Document 3"), pp.99–103 is used.

If it is discriminated in step 103 that the current frame is a pause period, then the non-quantized spectrum envelope and the quantized spectrum envelope are compared with each other in step 104 by the spectrum envelope comparison portion 4. In this instance, as an example of the method of the comparison, a method wherein an index LD and a threshold value $LD_{TH}$ given below are used may be used.

$$LD = \int_0^{f_s} \{nqsp(f) - qsp(f)\}^2 df \tag{11}$$

TABLE 1

| Condition | Difference between non-quantized spectrum envelope and quantized spectrum envelope |
|---|---|
| when $LD < LD_{TH}$ | determine that difference is small |
| when $LD \geqq LD_{TH}$ | determine that difference is large |

Then, if it is discriminated that the difference between the non-quantized spectrum envelope and the quantized spectrum envelope is large, a changed quantized spectrum coefficient which has been changed so as to approach the non-quantized spectrum envelope is calculated by the spectrum envelope changing portion 5 in step 105. First, variables used in FIG. 10 are described:

$LF_i(z)$: transfer function of low frequency region changing filter for code word i;

$MF_i(z)$: transfer function of meddle frequency region changing filter for code word i;

$HF_i(z)$: transfer function of high frequency region changing filter for code word i;

L: number of low frequency region code word;

M: number of middle frequency region code word;

H: number of high frequency region code word;

Ml: degree of denominator of $LF_i(z)$;

Nl: degree of numerator of $LF_i(z)$;

Mm: degree of denominator of $MF_i(z)$;

Nm: degree of numerator of $MF_i(z)$;

Mh: degree of denominator of $HF_i(z)$;

Nh: degree of numerator of $HF_i(z)$;

$\alpha l(i, j)$: coefficient of j-th order of denominator of low frequency region changing filter of code word i;

$\beta l(i, j)$: coefficient of j-th order of numerator of low frequency region changing filter of code word i;

$\alpha m(i, j)$: coefficient of j-th order of denominator of middle frequency region changing filter of code word i;

$\beta m(i, j)$: coefficient of j-th order of numerator of middle frequency region changing filter of code word i;

$\alpha h(i, j)$: coefficient of j-th order of denominator of high frequency region changing filter of code word i; and βh(i, j): coefficient of j-th order of numerator of high frequency region changing filter of code word i.

From the foregoing, the transfer functions of the changing filters corresponding to the code word i are such as given below:

$$LF_i(z) = \frac{\sum_{j=0}^{Nl-1} \beta l(i, j) \times z^{-j}}{1 - \sum_{j=1}^{Ml} \alpha l(i, j) \times z^{-j}} \tag{12}$$

$$MF_i(z) = \frac{\sum_{j=0}^{Nm-1} \beta m(i, j) \times z^{-j}}{1 - \sum_{j=1}^{Mm} \alpha m(i, j) \times z^{-j}} \tag{13}$$

$$NF_i(z) = \frac{\sum_{j=0}^{Nn-1} \beta n(i, j) \times z^{-j}}{1 - \sum_{j=1}^{Mn} \alpha n(i, j) \times z^{-j}} \tag{14}$$

In this instance, if it is assumed that a quantized spectrum which has Li as a low frequency region code word, Mi as a middle frequency region code word and Hi as a high frequency region code word, then the changed quantized spectrum coefficient can be represented as follows:

$$\alpha c[LiMiHi](i)\ (0 \leq i < K) \tag{15}$$

$$\beta c[LiMiHi](i)\ (0 \leq i < N) \tag{16}$$

where $$K = Ml \times Mm \times Mh \tag{17}$$

$$N = Nl \times Nm \times Nh \tag{18}$$

Consequently, the transfer function H[LiMiHi](z) of a composite filter by the changed quantized spectrum coefficient and the spectrum envelope sp[LiMiHi](f) are given as follows:

$$H[LiMiHi](z) = \frac{\sum_{i=0}^{N-1} \beta c[LiMiHi](i) \times z^{-i}}{1 - \sum_{i=1}^{K} \alpha c[LiMiHi](i) \times z^{-i}} \tag{19}$$

$$= HF_i(z) \times MF_i(z) \times LF_i(z) \times Hq(z) \tag{20}$$

$$sp[LiMiHi](f) = |H[LiMiHi](e^{j2\pi fT_s})| \tag{21}$$

The difference between the spectrum envelope sp[LiMiHi](f) given above and the non-quantized spectrum envelope nqsp(f) given by the expression (2) is evaluated based on such an evaluation expression as given by the expression (11) to search for a combination of the code words Li, Mi and Hi which minimizes the difference. The code words Li, Mi and Hi then are the selected code words, and αc[(LiMiHi](i) and βc[LiMiHi] are the changed quantized spectrum coefficients.

Changed quantized spectrum coefficients are determined in this manner by the spectrum envelope changing portion 5.

Then, high efficiency coding is performed by the high efficiency coding portion 7 using, when the difference between the non-quantized spectrum envelope and the quantized spectrum envelope is large, the changed quantized spectrum coefficients, but using, when the difference is small, the quantized spectrum coefficients. The high efficiency code, the code word of the quantized spectrum coefficient and the spectrum change information are outputted collectively as a background noise updating signal. Thereafter, a signal to be outputted in the current frame is selected by the data switching portion 10 in such a manner as described hereinabove.

Next, operation of the speech decoding apparatus 53 of the reception site 54 is described. If the construction of the spectrum envelope changing portion 5 of the speech coding apparatus 51 is such as described hereinabove, then the changed spectrum coefficient calculation portion 26 may calculate changed quantized spectrum coefficients using the expressions (12) to (16), (19) and (20) given hereinabove.

Second Embodiment

Figure 11:
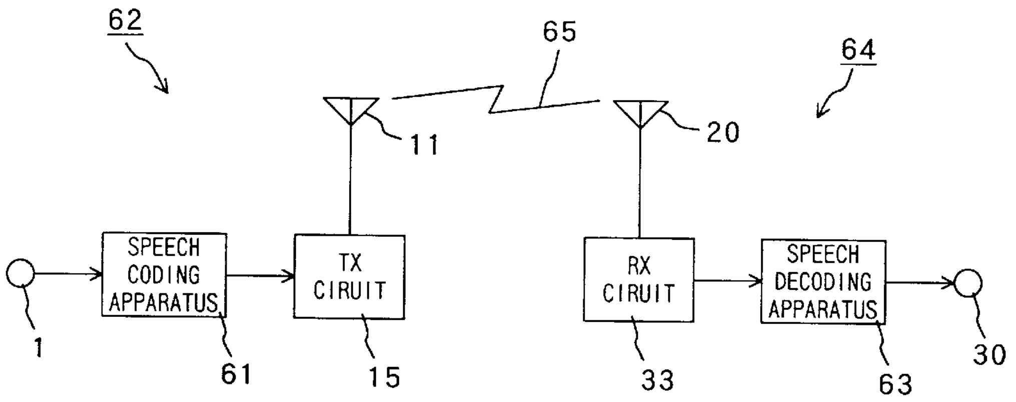
FIG. 11 is a block diagram showing a construction of a speech coding and decoding system of a second embodiment of the present invention.

A speech coding and decoding system of a second embodiment of the present invention shown in FIG. 11 is constructed such that a transmission site 62 at which a speech coding apparatus 61 is provided and a reception site 64 at which a speech decoding apparatus 63 is provided are connected to each other by a radio channel 65 and a coded speech signal is transmitted by digital radio transmission. Similarly as in the first embodiment, the transmission site 62 includes a microphone 1, a transmission circuit 15 and a transmission antenna 11 while the reception site 64 includes a reception antenna 20, a reception circuit 33 and a loudspeaker 30. The transmission circuit 15 stops its operation when no signal is outputted from the speech coding apparatus 61 so that reduction in power required for radio transmission is achieved.

Figure 12:
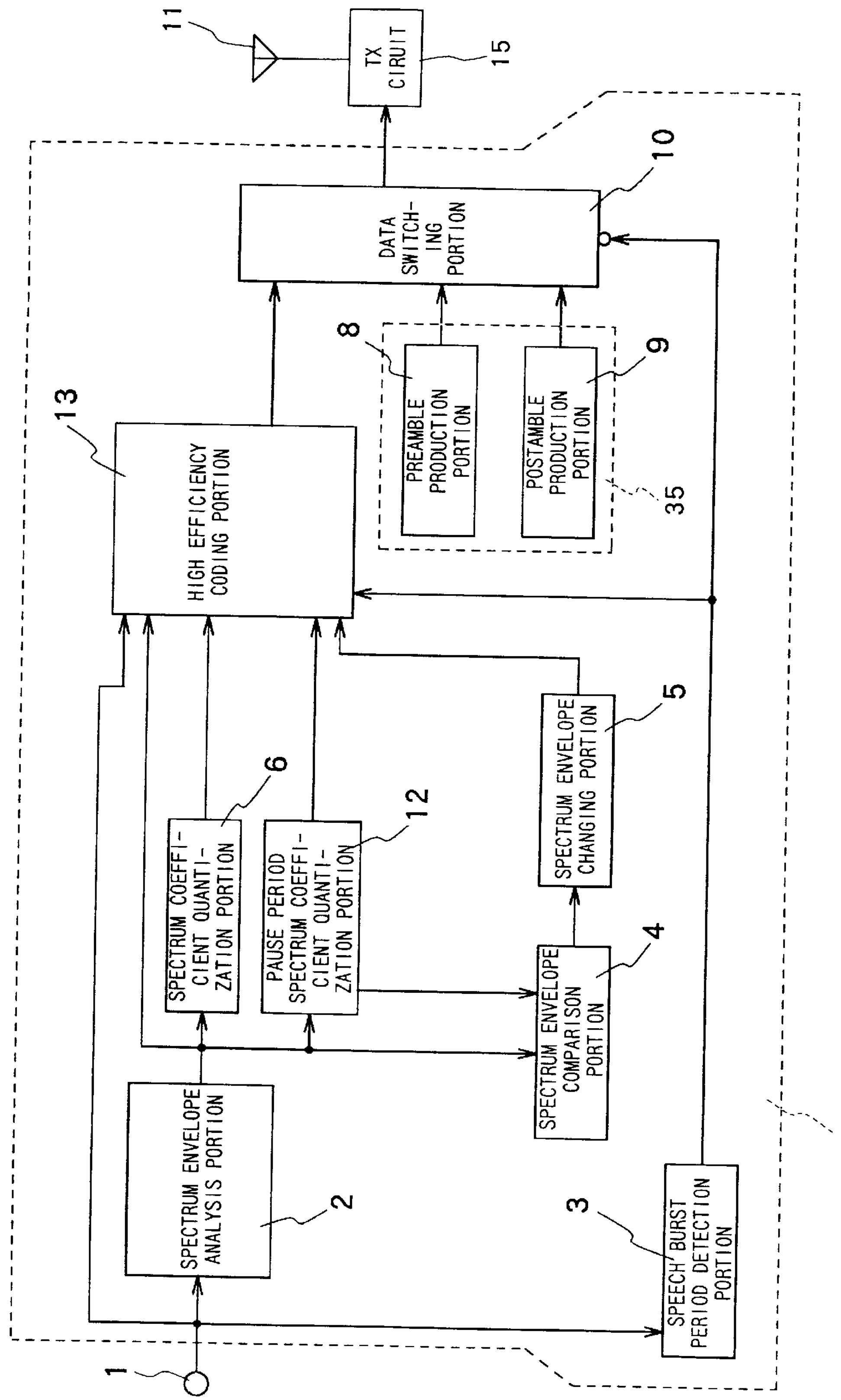
FIG. 12 is a block diagram showing a construction of a speech coding apparatus of the speech coding and decoding system of the second embodiment.

First, a construction of the speech coding apparatus 61 of the transmission site 62 is described with reference to FIG. 12.

The speech coding apparatus 61 is different from m the speech coding apparatus 51 of the first embodiment shown in FIG. 6 in that it includes, in place of the high efficiency coding portion 7, another high efficiency coding portion 13 and additionally includes a pause period spectrum coefficient quantization portion 12. In FIG. 12, those elements denoted by same reference numerals as those shown in FIG. 6 are same functional blocks as those shown in FIG. 6.

The pause period spectrum coefficient quantization portion 12 converts a non-quantized spectrum coefficient and a non-quantized spectrum envelope calculated by the spectrum envelope analysis portion 2 when a background noise updating signal is to be produced in a pause period into a quantized spectrum coefficient and a quantized spectrum envelope, respectively, and includes a codebook optimized to quantize a non-quantized spectrum in a pause period. In the following description, the quantized spectrum coefficient and the quantized spectrum envelope calculated by the pause period spectrum coefficient quantization portion 12 are referred to specifically as "pause period quantized spectrum coefficient" and "pause period quantized spectrum envelope", respectively.

In the first embodiment described above, what are inputted to and compared by the spectrum envelope comparison portion 4 when a background noise updating signal is to be produced are a non-quantized spectrum envelope calculated by the spectrum envelope analysis portion 2 and a quantized spectrum envelope calculated by the spectrum coefficient quantization portion 6, and also what is changed by the spectrum envelope changing portion 5 is the quantized spectrum envelope calculated by the spectrum coefficient quantization portion 6. However, in the present second embodiment, what are compared by the spectrum envelope comparison portion 4 are a non-quantized spectrum envelope calculated by the spectrum envelope analysis portion 2 and a pause period quantized spectrum envelope calculated by the pause period spectrum coefficient quantization portion 12, and also what is changed by the spectrum envelope changing portion 5 is the pause period quantized spectrum envelope.

Further, while the spectrum coefficient quantization portion 6 has a codebook optimized to quantize a non-quantized spectrum envelope for a speech burst period, the pause period spectrum coefficient quantization portion 12 has another codebook optimized to quantize a non-quantized spectrum envelope for a pause period as described above. Here, the magnitude of the codebook included in the pause period spectrum coefficient quantization portion 12 is much smaller than the codebook of the spectrum coefficient quantization portion 6. This is because, since, in a pause period, the quantized spectrum coefficient is further changed by the spectrum envelope changing portion 5 so as to approach a non-quantized spectrum envelope, a large scale codebook need not be used for the codebook.

The high efficiency coding portion 13 produces, in a speech burst period, a high efficiency code based on an original speech signal inputted from the microphone 1, a non-quantized spectrum coefficient produced by the spectrum envelope analysis portion 2 and a quantized spectrum coefficient produced by the spectrum coefficient quantization portion 6 similarly to the high efficiency coding portion 7 of the first embodiment, and a combination of the high efficiency code and a code word corresponding to the quantized spectrum coefficient is outputted as a speech burst code signal. On the other hand, in a pause period, the pause period spectrum high efficiency coding portion 13 produces a high efficiency code using the original speech signal inputted from the microphone 1, the non-quantized spectrum coefficient produced by the spectrum envelope analysis portion 2 and a changed quantized spectrum coefficient produced by the spectrum envelope changing portion 5, and combines a code word of a pause period quantized spectrum coefficient calculated by the pause period spectrum coefficient quantization portion 12 and a code word of spectrum change information obtained by the spectrum envelope changing portion 5 to the high efficiency code to produce a background noise updating signal, and then outputs the background noise updating code.

Figure 13:
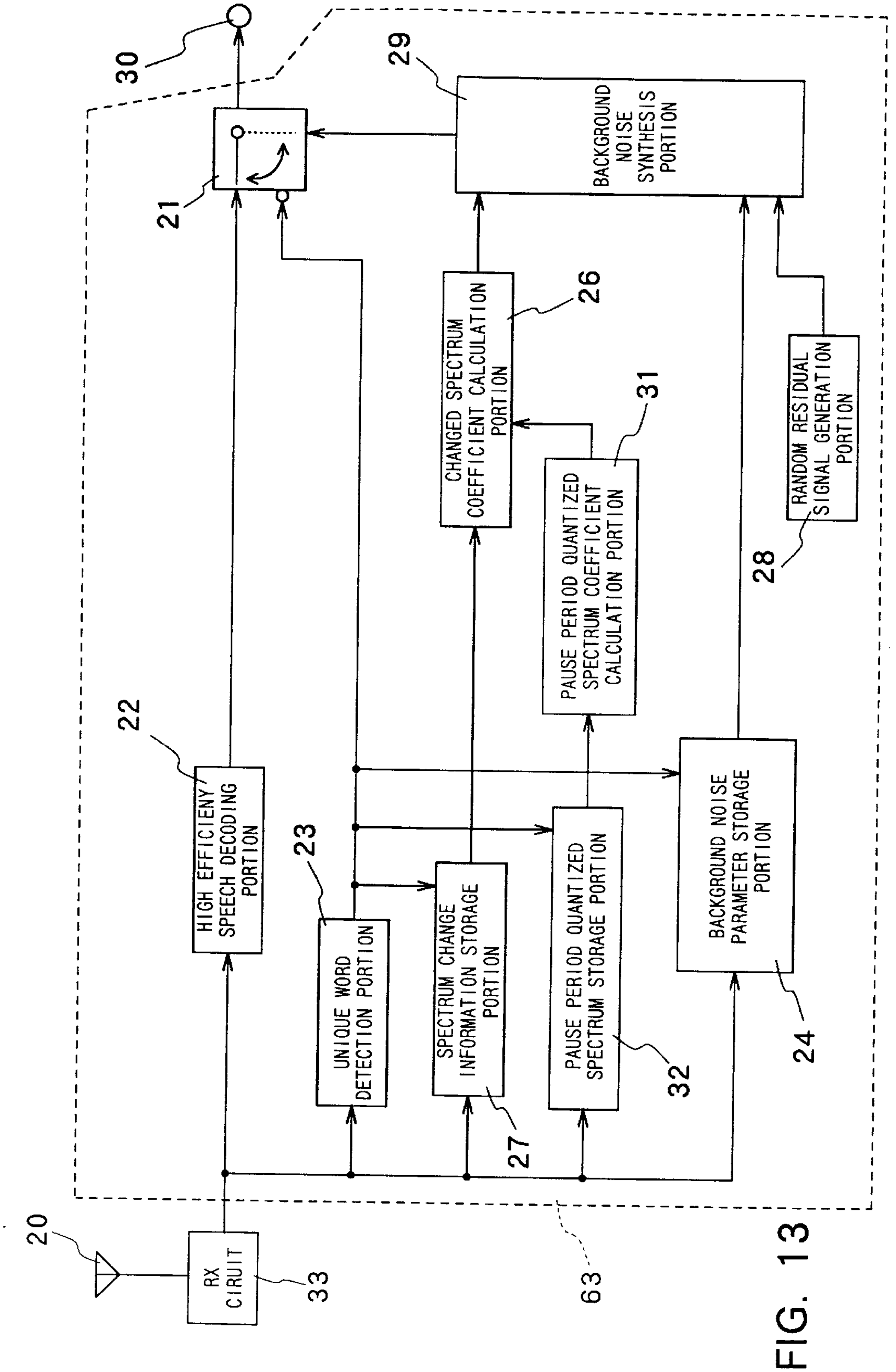
FIG. 13 is a block diagram showing a construction of a speech decoding apparatus of the speech coding and decoding system of the second embodiment.

Next, a construction of the speech decoding apparatus 63 is described with reference to FIG. 13. The speech decoding apparatus 63 includes, in addition to the components of the speech decoding apparatus 53 in the first embodiment shown in FIG. 7, a pause period quantized spectrum coefficient calculation portion 31 and a pause period quantized spectrum storage portion 32, but does not include the quantized spectrum coefficient calculation portion 25 instead. In FIG. 13, those elements denoted by same reference numerals as those shown in FIG. 7 are same functional blocks as those shown in FIG. 7.

The pause period quantized spectrum storage portion 32 is a memory which receives a detection result of the unique word detection portion 23 and a reception signal and stores therein code words of pause period quantized spectrum coefficients to be used upon production of background noise. The pause period quantized spectrum coefficient calculation portion 31 receives a code word stored in the pause period quantized spectrum storage portion 32 and calculates a pause period quantized spectrum coefficient. In particular, a quantized spectrum coefficient same as a quantized spectrum coefficient calculated by the pause period spectrum coefficient quantization portion 12 provided in the coding apparatus is calculated also by the pause period quantized spectrum coefficient calculation portion 31. A pause period quantized spectrum coefficient outputted from the pause period quantized spectrum coefficient calculation portion 31 is inputted to the changed spectrum coefficient calculation portion 26. Similarly to the spectrum change information storage portion 27 and the background noise parameter storage portion 24, when a background noise updating signal is received, the data stored in the pause period quantized spectrum storage portion 32 are updated in accordance with the contents of the reception signal.

Figure 14:
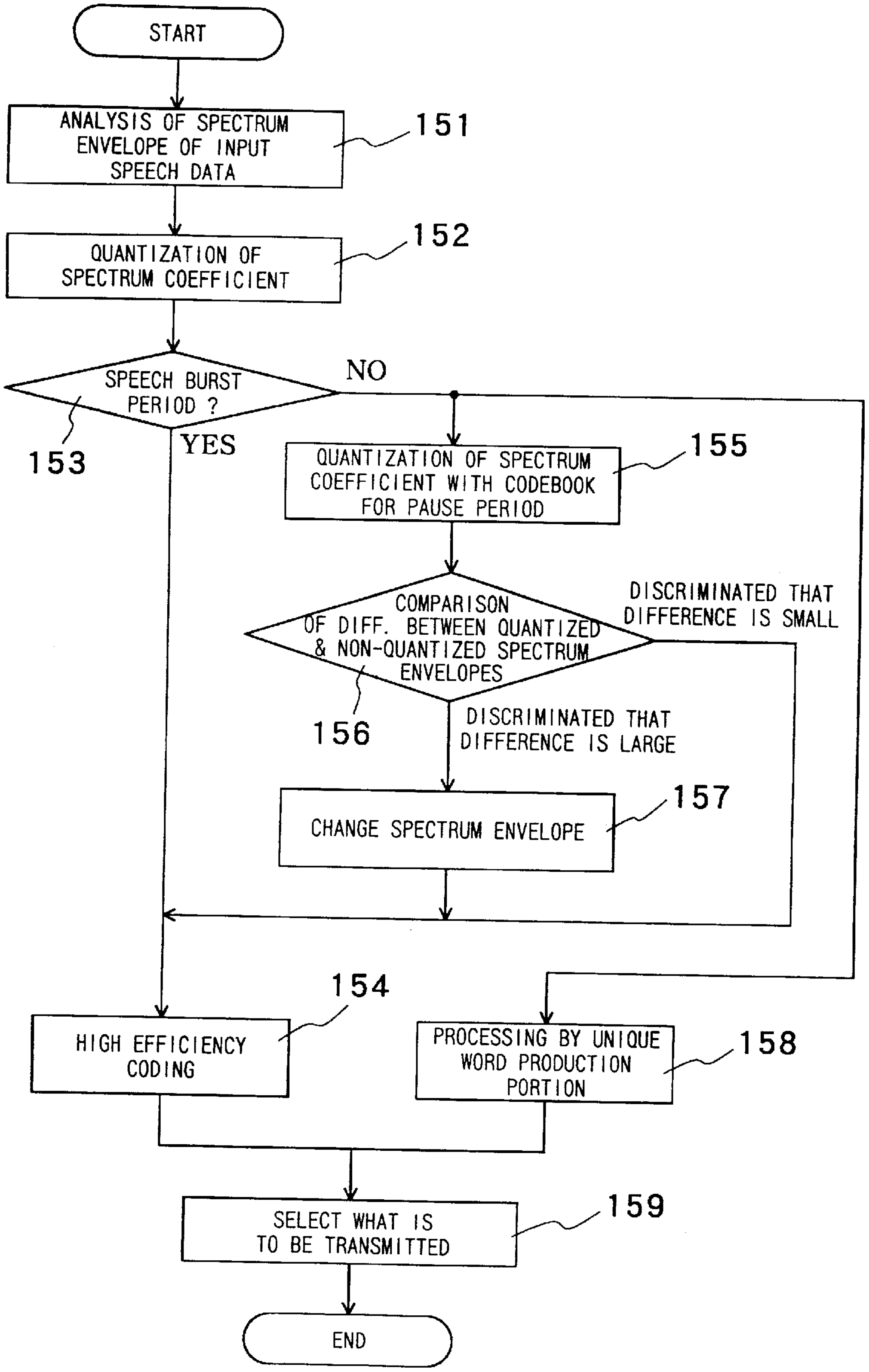
FIG. 14 is a flow chart illustrating operation of the speech coding apparatus shown in FIG. 12.

In the following, operation of the speech coding and decoding system of the present second embodiment is described with reference to FIG. 14.

First, processing of the speech coding apparatus 61 of the transmission site 62 is described with reference to FIG. 14.

Similarly as in the first embodiment, in step 151, a non-quantized spectrum envelope and a non-quantized spectrum coefficient of an original speech signal are calculated by the spectrum envelope analysis portion 2. Then, the non-quantized spectrum coefficient is inputted to the spectrum coefficient quantization portion 6, by which a quantized spectrum envelope, a quantized spectrum coefficient and a code word corresponding to the quantized spectrum coefficient are calculated in step 152.

Further, the speech burst period detection portion 3 analyzes, in step 153, the inputted original speech signal and discriminates whether or not the current frame is a speech burst period or a pause period. If it is discriminated that the current frame is a speech burst period, the control sequence advances to step 154, in which high efficiency coding is performed. The high efficiency code obtained by the high efficiency coding portion 13 is sent out, in step 159, as an output of the speech coding apparatus 61 from the data switching portion 10 and transmitted from the transmission antenna 11.

On the other hand, the processing when it is discriminated in step 153 that the current frame is a pause period is such as described below. First, a non-quantized spectrum coefficient calculated by the spectrum envelope analysis portion 2 is inputted to the pause period spectrum coefficient quantization portion 12. In step 155, the pause period spectrum coefficient quantization portion 12 determines a pause period quantized spectrum coefficient and a pause period quantized spectrum envelope from the inputted non-quantized spectrum coefficient using the pause period code book. Then, in step 156, the spectrum envelope comparison portion 4 compares the non-quantized spectrum envelope calculated by the spectrum envelope analysis portion 2 and the pause period quantized spectrum envelope calculated by the pause period spectrum coefficient quantization portion 12 with each other to discriminate whether or not the difference between them is large. If it is discriminated that the difference is large, then the spectrum envelope changing portion 5 calculates, in step 157, a changed quantized spectrum coefficient which has been obtained by changing the pause period quantized spectrum coefficient so as to approach the non-quantized spectrum envelope. Thereafter, in step 154, high efficiency coding is performed by the high efficiency coding portion 13 using, when it was discriminated in step 156 that the difference between the spectrum envelopes is large, the changed quantized spectrum coefficient, but using, when the difference is small, the pause period quantized spectrum coefficient. This high efficiency code, the code word of the quantized spectrum coefficient and spectrum change information are collectively outputted as a background noise updating signal.

Further, when it was discriminated in step 153 that the current frame is a pause period, a preamble signal is produced by the preamble production portion 8 and a postamble signal is produced by the postamble production portion 9 in step 158 in a substantially simultaneous parallel relationship to steps 156 and 157 described above, and the preamble signal and the postamble signal are inputted to the data switching portion 10. Then, also in a pause period, a signal to be outputted in the current frame is selected in step 159 by the data switching portion 10. More particularly, (1) in a frame in which a background noise updating code is to be issued, the background noise updating signal produced by the high efficiency coding portion 13 is selected, but (2) in a frame in which a preamble signal is to be issued, the preamble signal produced by the preamble production portion 8 is selected, but otherwise (3) in a frame in which a postamble signal is to be issued, the postamble signal produced by the postamble production portion 9 is selected.

Figure 15:
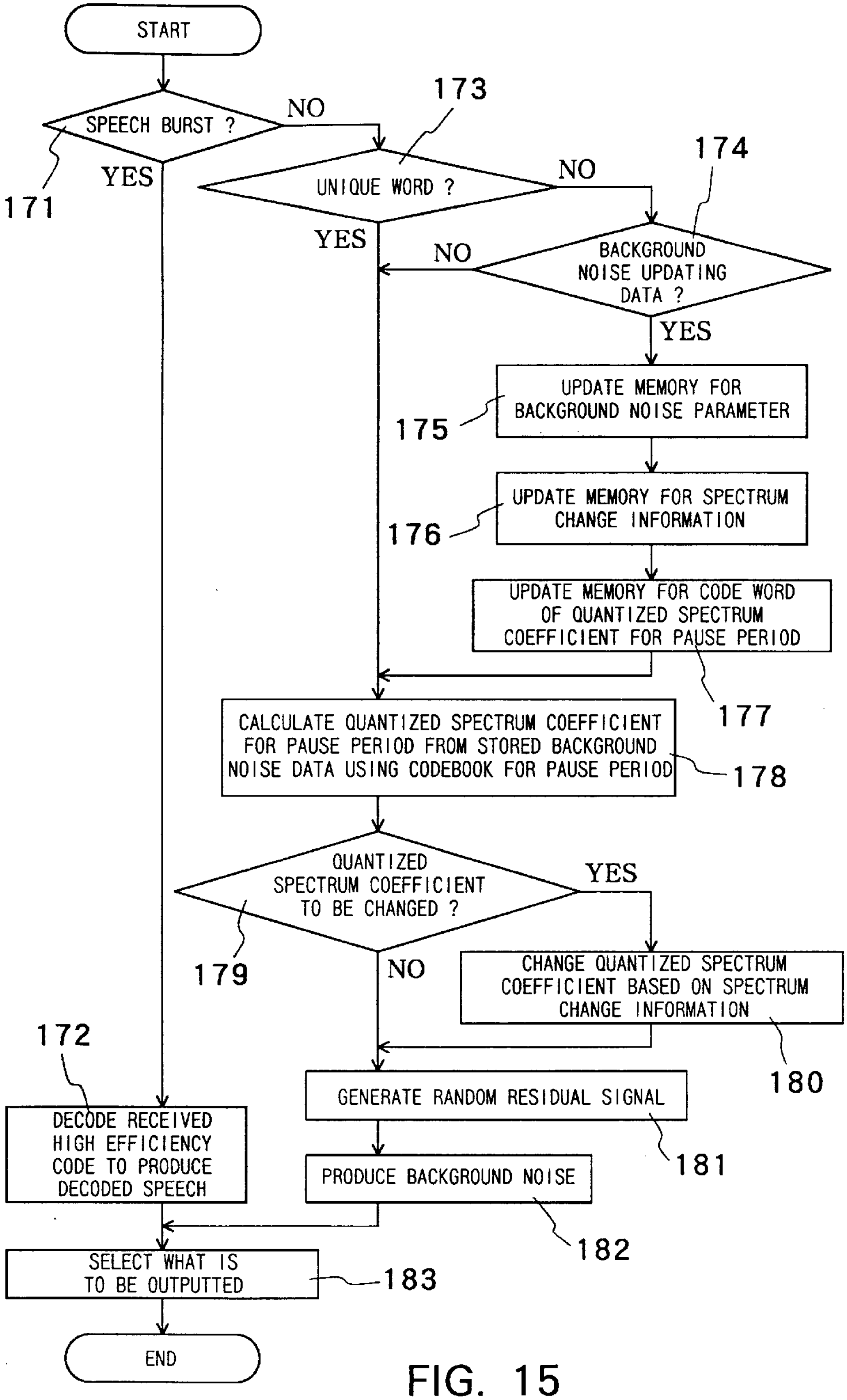
FIG. 15 is a flow chart illustrating operation of the speech decoding apparatus shown in FIG. 13.

Next, processing by the speech decoding apparatus 63 of the reception site 64 is described with reference to FIG. 15.

In step 171, a reception signal is inputted to the unique word detection portion 23, by which it is discriminated whether or not the current frame is a speech burst period or a pause period. If the current frame is a speech burst period, then the received high efficiency code is decoded by the high efficiency speech decoding portion 22 in step 172, and the decoded sound is selected by the switch 21 and outputted from the loudspeaker 30 instep 183.

On the other hand, if it is discriminated in step 171 that the current frame is a pause period, then it is discriminated in step 173 by the unique word detection portion 23 whether or not the received signal is a unique word. Here, if the received signal is not a unique word, then it is discriminated in step 174 whether or not the received signal is a background noise updating signal (data for background noise updating). When it is discriminated in step 173 that the received signal is a unique word or it is discriminated in step 174 that the received signal is not background noise updating data, the control sequence advances to step 178. If it is discriminated in step 174 that the received signal is a background noise updating signal, then the background noise parameters stored in the background noise parameter storage portion 24 are updated in step 175 with a background noise parameter, spectrum change information and a pause period quantized spectrum obtained from the newly received background noise updating signal. Then, in step 176, the spectrum change information stored in the spectrum change information storage portion 27 is updated, and in step 177, the code word stored in the pause period quantized spectrum storage portion 32 is updated, whereafter the control sequence advances to step 178.

In step 178, the pause period quantized spectrum coefficient calculation portion 31 calculates a pause period quantized spectrum coefficient using the data (pause period quantized spectrum coefficient code words) stored in the pause period quantized spectrum storage portion 32. The pause period quantized spectrum coefficient calculated is inputted to the changed spectrum coefficient calculation portion 26 together with the spectrum change information stored in the spectrum change information storage portion 27. The changed spectrum coefficient calculation portion 26 discriminates in step 179 based on the spectrum change information whether or not the pause period quantized spectrum coefficient should be updated. If there is the necessity to update the pause period quantized spectrum coefficient, the pause period quantized spectrum coefficient is changed in accordance with the spectrum change information in step 180 to calculate a changed quantized spectrum coefficient.

Then, in step 181, a random residual signal is produced by the random residual signal generation portion 28. After the random residual signal is produced, the background noise parameter stored in the background noise parameter storage portion 24, the changed quantized spectrum coefficient calculated by the changed spectrum coefficient calculation portion 26 or the pause period quantized spectrum coefficient calculated by the pause period quantized spectrum coefficient calculation portion 31, and the random residual signal mentioned above are inputted to the background noise synthesis portion 29, by which background noise is produced in step 182. Here, the changed quantized spectrum coefficient is used when the quantized spectrum is changed in step 180, and the pause period quantized spectrum coefficient is used when it is discriminated in step 179 that the quantized spectrum should not be changed. In a pause period, since background noise is selected by the switch 21 in step 183, the background noise is outputted from the loudspeaker 30.

As described above, in the present invention, by performing, in a pause period, filtering processing for a quantized spectrum coefficient to make a quantized spectrum envelope approach a non-quantized spectrum envelope, the sound quality in the pause period can be improved without using such a large codebook for calculation of quantized spectrum coefficients as is used in a speech burst period. Further, also by using a codebook for calculation of quantized spectrum coefficients for a pause period having a small size together with filter processing, the sound quality in the pause period can be improved without using a codebook of a large size.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A speech signal transmission method wherein, on a transmission side, an input speech signal is coded and transmitted as coded data to a reception side, and on the reception side, the coded data are decoded and outputted as an output speech signal, comprising the stops of:

detecting a pause period of the input speech signal on the transmission side;

producing a background noise updating signal by coding the input speech signal in the pause period on the transmission side;

calculating a quantized spectrum, a non-quantized spectrum envelope and a quantized spectrum envelope from the input speech signal in the pause period on the transmission side;

stopping a transmission for a predetermined period on the transmission side after the background noise updating signal is transmitted from the transmission side to the reception side; and producing, within the predetermined period, background noise based on the background noise updating signal received to output a background noise signal on the reception side, wherein when a difference between the non-quantized spectrum envelope and the quantized spectrum envelope is larger than a predetermine threshold value, the quantized spectrum is changed and the background noise updating signal is produced based on the changed quantized spectrum.

2. The speech signal transmission method according to claim 1, wherein the input speech signal in a speech burst period is coded by using a first codebook, and the input speech signal in the pause period is coded by using a second codebook different from said first codebook.

3. A speech coding and decoding system which executes VOX (Voice Operated Transmitter) processing of producing background noise, comprising:

a speech coding apparatus; and a speech decoding apparatus;

said speech coding apparatus including spectrum envelope comparison means for quantitatively calculating a difference between a non-quantized spectrum envelope and a quantized spectrum envelope of an input signal to said speech coding apparatus and spectrum envelope changing means for changing the quantized spectrum envelope in response to the difference, and using the quantized spectrum envelope changed by said spectrum envelope changing means in order to produce coding processing for background noise and then transmitting spectrum change information regarding the change of quantized spectrum envelope to said speech decoding apparatus side, and said speech decoding apparatus including spectrum change information storage means for storing the received spectrum change information and changed spectrum coefficient calculation means for changing the received quantized spectrum envelope based on the spectrum change information stored in said spectrum change information storage means, and using, in order to produce background noise, the quantized spectrum outputted form said changed spectrum coefficient calculation means.

4. The speech coding and decoding system according to claim 3, wherein said speech coding apparatus further includes a first codebook, a second codebook having different contents from those of said first codebook, first spectrum coefficient quantization means for quantizing the input signal in a speech burst period using said first codebook, and second spectrum coefficient quantization means for quantizing the input signal in the pause period using said second codebook.

5. The speech coding and decoding system according to claim 4, wherein said spectrum envelope changing means changes the quantized spectrum envelope by filter processing.

6. The speech coding and decoding system according to claim 3, wherein said spectrum envelope changing means changes the quantized spectrum envelope by filter processing.

* * * * *